United States Patent [19]
Kumar

[11] Patent Number: 4,913,709
[45] Date of Patent: Apr. 3, 1990

[54] ADSORPTION PROCESS FOR RECOVERING TWO HIGH PURITY GAS PRODUCTS FROM MULTICOMPONENT GAS MIXTURES

[76] Inventor: Ravi Kumar, 991 N. Treeline Dr., Allentown, Pa. 18103

[21] Appl. No.: 312,146

[22] Filed: Feb. 17, 1989

[51] Int. Cl.⁴ ............................................. B01D 53/04
[52] U.S. Cl. ............................................ 55/26; 55/58; 55/62; 55/68; 55/73; 55/74; 55/75
[58] Field of Search ................. 55/25, 26, 58, 62, 68, 55/73, 74, 75

[56] References Cited

U.S. PATENT DOCUMENTS

| | | | |
|---|---|---|---|
| Re. 31,014 | 8/1982 | Sircar | 55/26 |
| 3,252,268 | 5/1966 | Stark | 55/25 |
| 4,171,207 | 10/1979 | Sircar | 55/26 |
| 4,529,412 | 7/1985 | Hayashi et al. | 55/58 X |
| 4,539,020 | 9/1985 | Sakuraya et al. | 55/26 |
| 4,737,167 | 4/1988 | Ohtani et al. | 55/26 |
| 4,770,676 | 9/1988 | Sircar et al. | 55/26 |
| 4,790,858 | 12/1988 | Sircar | 55/26 |
| 4,813,980 | 3/1989 | Sircar | 55/26 |

FOREIGN PATENT DOCUMENTS

| | | | |
|---|---|---|---|
| 0129444 | 12/1984 | European Pat. Off. | 55/26 |
| 3543468 | 6/1987 | Fed. Rep. of Germany | 55/25 |
| 60-103002 | 6/1985 | Japan . | |
| 62-250927 | 10/1987 | Japan | 55/25 |

Primary Examiner—Robert Spitzer
Attorney, Agent, or Firm—John M. Fernbacher; James C. Simmons; William F. Marsh

[57] ABSTRACT

An improved pressure swing adsorption process is disclosed for the recovery of high-purity primary and secondary components from a multicomponent gas mixture. The process utilizes a first group of absorbent beds selective for the secondary component and a second group of adsorbent beds selective for retention of tertiary impurities in the mixture. The gas mixture is passed through a first and second bed in series, very high purity primary component product is discharged from the second bed, and high purity secondary component product is recovered by desorption from the first bed. A low-pressure purge of the first bed with high-purity secondary component product is utilized to minimize compression power and improve purity of the secondary product component. Several novel pressure equalization steps improve primary product recovery and reduce power consumption. Further increased product recovery is realized by recycling depressurization and purge streams from the first bed. The process can be used to recover high-purity hydrogen and carbon dioxide from a gas mixture containing these components along with minor amounts of methane, carbon monoxide, and nitrogen.

27 Claims, 5 Drawing Sheets

ADSORPTION PROCESS FOR RECOVERING TWO HIGH PURITY GAS PRODUCTS FROM MULTICOMPONENT GAS MIXTURES

TECHNICAL FIELD

The present invention relates in general to the separation of gas mixtures, with individual recovery at high purity of at least two of the components contained therein, by pressure swing adsorption.

BACKGROUND OF THE INVENTION

The separation of multicomponent gas mixtures by pressure swing adsorption (PSA) is a well-established and widely-practiced technology. A large body of prior art in this field pertains to the recovery of a single component at high purity from a mixture of that component with impurities present at lower concentrations, or the recovery of one product at high purity and a second product at low purity from a gas mixture. One example of the former is the recovery of high purity hydrogen from petroleum refinery gas streams; an example of the latter is the separation of air into a medium to high purity nitrogen stream and a low purity, oxygen-rich stream. In these types of separations, parallel adsorbent beds are operated sequentially as parallel sets of single-stage adsorbers.

There is a smaller body of prior art in which at least two products, in some cases both at high purity, are recovered from a gas mixture in a series of staged or semi-staged adsorbent beds, each stage of which is selective for a different component or group of components in the mixture. U.S. Pat. No. 3,252,268 discloses a PSA system comprising three adsorption stages in which a product is recovered in part at high purity and in part at ultra-high purity. In this system, the first stage adsorbs most of the major contaminants in the feed stream, the second stage selectively adsorbs at least one impurity component in the effluent from the first stage, and the third stage selectively adsorbs at least one impurity component in the effluent from the second stage. An ultra-high purity product is recovered as the effluent from the third stage adsorber, and a moderately pure product is recovered as effluent from the second stage adsorber and as depressurization gas from the third stage adsorber. As an example, ultra-pure hydrogen at 99.995% purity and moderately pure hydrogen at 99% purity are recovered by the disclosed process from refinery offgases.

U.S. Pat. No. 4,171,207 discloses a PSA system comprising two groups of adsorbent beds for the recovery of two high purity products from a gas mixture containing a primary key component, a secondary key component which is more strongly adsorbed than the primary key component, and one or more tertiary components at low concentrations which are more strongly adsorbed than the primary or secondary key components. The gas mixture is passed through a first adsorbent bed in which the tertiary components are selectively adsorbed, and then a second adsorbent bed in which the secondary key component is selectively adsorbed; a product stream of high purity primary key component is withdrawn as an effluent stream from the second adsorbent bed. Flow through the two beds is then discontinued, and the second bed is rinsed at feed pressure with a stream of high purity secondary key component. This rinse step displaces other components present in the bed and saturates the bed with secondary key component. High purity secondary key component then is recovered by desorption from the second adsorbent bed. An example of this process is the adsorptive separation of a mixture of hydrogen, methane, and $C_2$[30] hydrocarbons to recover high purity hydrogen as the primary key component and high purity methane as the secondary key component.

U.S. Pat. Re. 3 1,014, a reissue of U.S. Pat. No. 4,171,206, discloses a PSA system comprising two sets of adsorbent beds for the recovery of two high purity products from a gas mixture containing a primary key component, a secondary key component which is more strongly adsorbed than the primary key component, and one or more tertiary components at low concentration which are less strongly adsorbed than the secondary key component and more strongly adsorbed than the primary key component. The gas mixture is passed through a first adsorbent bed in which the secondary key component is selectively adsorbed, and then through a second adsorbent bed in which the tertiary components are selectively adsorbed; a product stream of high purity primary key component is withdrawn as an effluent stream from the second adsorbent bed. Flow through the two beds is then discontinued, and the first bed is rinsed at feed pressure with a stream of high purity secondary key component. This rinse step displaces other components present in the bed and saturates the bed with secondary key component. High purity secondary key component is then recovered by desorption from the first adsorbent bed. An example of this process is the adsorptive separation of a mixture of hydrogen, carbon dioxide, carbon monoxide, methane, and nitrogen to recover high purity hydrogen as the primary key component and high purity carbon dioxide as the secondary key component.

Japanese patent application No.58-205592 discloses a three-stage PSA process for the recovery of three individual products from a multicomponent gas mixture comprising hydrogen, carbon monoxide, carbon dioxide, and nitrogen. Such a gas mixture is recovered, for example, from a steel converter furnace. The process comprises three separate multi-bed PSA systems arranged in series; the feed gas is passed through the first stage PSA in which $CO_2$ is preferentially adsorbed, through the second stage PSA in which CO is preferentially adsorbed, and then through the third stage PSA in which $N_2$ and residual CO are preferentially adsorbed. Hydrogen product is recovered as third stage effluent. $CO_2$ is recovered by desorption from the first stage and CO is recovered, after a rinse step, by desorption from the second stage. An example is disclosed in which CO is recovered at 99.4% purity and $H_2$ at 99.9% purity. $CO_2$ purity is not disclosed, but based upon the process steps used in the first PSA, would be at low purity compared with recovered CO and $H_2$. The three PSA systems operate independently, except for the use of the third stage waste stream comprising $N_2$ and CO as purge gas in the first stage. No intersystem pressure equalization steps are used in the process.

U.S. Pat. No. 4,539,020 discloses a two-stage PSA process for recovering carbon monoxide from a feed gas comprising carbon monoxide, carbon dioxide, and components less absorbable than carbon monoxide. Feed gas is passed to a first PSA system in which $CO_2$ is selectively adsorbed and recovered by the steps of adsorption, depressurization, evacuation, purging with waste gas from the second stage PSA system, and repressurization with first stage product gas. Effluent from the first stage PSA is introduced into the second stage PSA in which carbon monoxide is selectively adsorbed and recovered by the steps of adsorption, partial depressurization, pressure equalization, purge with product CO, evacuation yielding product CO, pressure equalization, and final repressurization to the adsorption pressure with purge effluent from another adsorbent bed in the second stage PSA system, a $CO_2$-rich waste gas is produced by the first stage PSA; the CO product from the second stage PSA contains less than 0.5% $CO_2$ and less than 1% $N_2$.

U.S. Pat. No. 4,790,858 discloses an improvement to previously cited U.S. Pat. Re. 31,014 wherein additional primary key component is recovered by passing the waste stream from the second set of adsorbent beds to a third set of adsorbent beds in which additional secondary key and tertiary components are selectively adsorbed. The additional recovered primary key component from the third adsorbent bed is used in part for purging the second adsorbent bed, and for purging and repressurizing another third adsorbent bed.

A distinguishing feature of the earlier cited U.S. Pat. No. 4,171,207 and U.S. Pat. Re. 31,014 is the high-pressure rinse step in which high purity secondary key component is utilized to rinse at the adsorption pressure, the adsorbent bed in which the secondary key component has been selectively adsorbed. This step is important in the recovery of secondary key component at high purity.

SUMMARY OF THE INVENTION

The present invention is an improved pressure swing adsorption process for the separation of a multicomponent gas mixture by pressure swing adsorption to recover as individual products a primary key component and a secondary key component, wherein the secondary key component is more strongly adsorbed than the primary key component and there is present in the multicomponent gas mixture one or more minor tertiary components at low concentrations which are less strongly adsorbed than the secondary key component, by passing the multicomponent gas mixture in an adsorption step through a first bed of adsorbent selective for retention of the secondary key component, passing the effluent from the first bed through a second bed of adsorbent selective for the retention of the secondary key component and of the one or more minor tertiary components, withdrawing from the second bed a high purity product stream of the primary key component, and continuing the passing of the multicomponent gas mixture through the first and second beds for a predetermined time period or until the concentration of the secondary key component in the effluent from the first bed or the concentration of at least one of the tertiary components in the high-purity stream of said primary key component from the second bed reaches a predetermined level; the improvement comprising discontinuing flow of the multicomponent gas mixture through the first and second beds at the end of the adsorption step, and thereafter during a mutually extending time period, (1) immediately following discontinuation of flow through the first and second beds, depressurizing the first bed by withdrawing a gas stream of desorbed and void space gas; (2) purging the first bed with a stream of the secondary key component whereby substantially all remaining tertiary components are displaced from the first bed in a first purge effluent stream; (3) evacuating the first bed by withdrawing a product stream of the secondary key component; (4) depressurizing the second bed by withdrawing a gas stream of desorbed and void space gas, and (5) purging said second bed by passing therethrough a stream of the primary key component whereby additional adsorbed components are desorbed and are withdrawn along the remaining void space gas in a second purge effluent stream; and following the mutually extending time period, (6) pressurizing the first and second beds to a pressure up to the pressure of the adsorption step by passing a portion of the high purity product stream of primary key component through the second bed and passing pressurization effluent from the second bed into the first bed, whereby both beds are prepared for another cycle beginning with the adsorption step.

The first adsorbent bed is one of a first group of parallel beds and the second adsorbent bed is one of a second group of parallel beds equal in number to the beds in the first group. Each bed of the first group is paired with a corresponding bed of the second group, and each pair of beds undergoes in cyclic fashion the adsorption step, followed during the mutually extending time period by the steps (1) through (5) described above, followed by the final pressurization step (6).

The present invention comprises four embodiments, each of which are improvements to the basic process cycle following the adsorption step. In the first and preferred embodiment, the basic process steps as summarized above are utilized, and in addition, several intermediate pressurization and depressurization steps are included to increase product recovery. In these intermediate steps, pressurization and depressurization are accomplished by pressure equalization between pairs of beds; the resulting interbed flow of gas allows product components normally lost in the above recited depressurization and purge steps to be retained in the adsorbent beds thus increasing recovery.

In the preferred embodiment, pressurization and depressurization steps by means of pressure equalization are carried out as follows:

(1a) Depressurization of the second bed, which has just completed its adsorption step, by connecting it with another first bed which has completed its evacuation step (3), whereby gas flows from the second bed into the other first bed so that the pressures in both beds are equalized at a first intermediate pressure.

(1b) Further depressurization of the second bed, which has completed step (1a) above, by connecting it with another second bed which has just completed purge step (5), whereby additional gas flows from the second bed into the other second bed so that the pressures in both beds are equalized at a second intermediate pressure. The second bed then undergoes depressurization step (4) as described earlier.

(3a) Pressurization of the first bed, which has completed evacuation step (3), by connecting it with another second bed which has just completed its adsorption step, whereby gas flows from the other second bed into the first bed so that the pressures in both beds are equalized at the first intermediate pressure. The first bed is then ready for repressurization step (6) described earlier.

(5a) Pressurization of the second bed, which has completed purge step (5), by connecting it with another second bed which has just completed its depressurization step (1a), whereby gas flows from the other second bed into the second bed so that pressures in both the beds are equalized at the second intermediate pressure. The first and second beds then undergo repressurization step (6) described earlier and are ready for another adsorption step.

In a second embodiment of the present invention, the basic process steps (1) through (6) recited earlier are utilized, and in addition, several pressurization and depressurization steps are carried out by means of pressure equalization as follows:

(1a) Depressurization of the second bed, which has completed its adsorption step, by connecting it with another second bed which has just completed purge step (5), whereby gas flows from the second bed to the other second bed so that the pressures in both beds are equalized at a first intermediate pressure.

(1b) Further depressurization of the second bed, which has completed step (1a) above, by connecting it with another first bed which is initially at a third intermediate pressure, whereby gas flows from the second bed to the other first bed so that the pressures in both beds are equalized at a second intermediate pressure.

(1c) Still further depressurization of the second bed by connecting it with the other first bed which has just completed its evacuation step (3), whereby gas flows from the second bed into the other first bed so that the pressures in both beds are equalized at a third intermediate pressure.

(3a) Pressurization of the first bed, which has just completed its evacuation step (3), by connecting it with yet another second bed which has completed its depressurization step (1b), whereby gas flows from the yet another second bed into the first bed so that the pressures in both beds are equalized at the third intermediate pressure.

(5a) Pressurization of the second bed, which has completed purge step (5) and is thus at near-ambient pressure, by connecting it with the other second bed which has just completed its adsorption step. whereby gas flows from the other second bed into the second bed so the pressures in both beds are equalized at the first intermediate pressure.

(3b) Further pressurization of the first bed, which has completed pressurization step (3a), by connecting it with the other second bed which has just completed depressurization step (1a) and is at the first intermediate pressure, whereby gas flows from the other second bed into the first bed so that the pressures in both beds are equalized at the second intermediate pressure.

The first and second beds then undergo repressurization step (6) described earlier and are ready for another adsorption step.

In a third embodiment of the present invention, the basic process steps (1) through (6) described earlier are utilized, and in addition, several pressurization and depressurization steps are carried out by means of pressure equalizations as follows:

(1a) Depressurization of the second bed, which has completed its adsorption step, by connecting it with another second bed at a second intermediate pressure, whereby gas flows from the second bed into the other second bed, thus equalizing the pressures in both beds at a first intermediate pressure.

(1b) Further depressurization of the second bed following step (1a) by connecting it with yet another second bed which has completed its purge step (5), whereby gas flows from the second bed into the yet another second bed so that the pressures in both beds are equalized at a second intermediate pressure.

(1c) Still further depressurization of the second bed following step (1b) by connecting it with another first bed which is initially at a fourth intermediate pressure, whereby gas flows from the second bed into the other first bed so that pressures in both beds are equalized at a third intermediate pressure.

(5a) Pressurization of the second bed, after completing purge step (5), by connecting it with the other second bed which has completed depressurization step (1a), whereby gas flows from the other second bed into the second bed so that the pressures in both beds are equalized at the second intermediate pressure.

(3a) Pressurization of the first bed, after completing evacuation step (3), to a fourth intermediate pressure by passing at least a portion of the purge effluent from the other first bed into the first bed.

(3b) Further pressurization of the first bed, after completing step (3a), by connecting it with the other second bed which has completed depressurization step (1b), whereby gas flows from the other second bed into the first bed so that the pressures in both beds are equalized at the third intermediate pressure.

(5b) Further pressurization of the second bed, after completing step (5a), by connecting it with yet another second bed which has completed its adsorption step, whereby gas flows from the yet another second bed into the second bed so that the pressures in both beds are equalized at the first intermediate pressure.

Upon completion of steps (3b) and (5b), the first and second beds are further pressurized in repressurization step (6) as described earlier and are then ready for another adsorption step.

In a fourth embodiment of the present invention, the basic process steps (1) through (6) described earlier are utilized, and in addition, several pressurization and depressurization steps are carried out by means of pressure equalization as follows:

(1a) Depressurization of the first bed, which has completed its adsorption step, by connecting it with another first bed initially at a fourth intermediate pressure, whereby gas flows from the first bed into the other first bed so that the pressures in both beds are equalized at a first intermediate pressure.

(1b) Depressurization of the second bed, which has completed its adsorption step, by connecting it with another second bed initially at a third intermediate pressure whereby gas flows from the second bed into the other second bed so that the pressures in both beds are equalized at a second intermediate pressure.

(1c) Further depressurization of the second bed, after the completion of step (ab), by connecting it with yet another second bed which has completed its purge step (5) whereby gas flows from the second bed into the yet another second bed so that the pressures in both beds are equalized at a third intermediate pressure.

(3a) Pressurization of the first bed, following evacuation step (3) of the first bed, in which at least a portion of the purge effluent from the other first bed is passed into the first bed which is then pressurized to a fourth intermediate pressure.

(5a) Pressurization of the second bed, which has completed purge step (5), by connecting it with the other second bed which has completed step (1b) whereby gas flows from the other second bed into the second bed so that the pressures in both beds are equalized at the third intermediate pressure.

(3b) Further pressurization of the first bed, following step (3a), by connecting with yet another first bed which has completed its adsorption step, whereby gas flows from the yet another first bed into the first bed so that the pressures in both the beds are equalized at the first intermediate pressure.

(5b) Further pressurization of the second bed, which has completed step (5a), by connecting it with the yet another second bed which has completed its adsorption step whereby gas flows from the yet another second bed into the second bed so that the pressures in both the beds are equalized at the second intermediate pressure.

After steps (3b) and (5b) are completed, the first and second beds are further pressurized in repressurization step (6) and are then ready for another adsorption step.

By utilizing the above described preferred embodiment of the present invention, a gas mixture containing hydrogen and carbon dioxide as primary and secondary key components respectively, and also containing carbon monoxide, methane, and nitrogen as tertiary components, can be separated into a very high purity hydrogen product (>99.99 mole % $H_2$) and a high purity carbon dioxide product (>99.7 mole % $CO_2$).

Further recovery of product components is accomplished by recycling effluent gas from the first bed depressurization and low-pressure purge steps (steps (1) and (2)) to the feed into the first bed. Further recovery of primary key component is accomplished by passing the second bed depressurization and purge effluent gas (steps (4) and (5)) through a third bed of adsorbent in which remaining secondary and tertiary component impurities are selectively adsorbed and high-purity primary key component is withdrawn from the bed. This recovered primary key component can be used for one or more of the following purposes: as additional product, as purge gas for the second bed purge step (5), and as pressurization gas for an initial portion of the repressurization step (6).

DETAILED DESCRIPTION OF THE INVENTION

Figure 1:
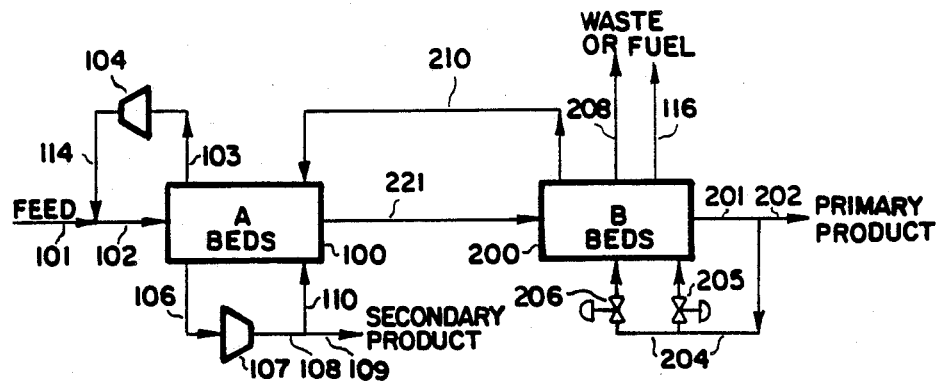
FIG. 1 is a schematic flow diagram of the present invention showing the general flow of gas for the first (A) beds and second (B) beds.

The general gas flows for four embodiments of the present invention are shown schematically in FIG. 1. The groups of first (A) beds and second (B) beds each comprise four or five parallel beds of adsorbent. Pressurized feed gas mixture enters the system as stream 101 and is combined with recycle stream 114 from a gas storage tank (not shown) and the combined stream 102 passes to the first or A beds 100. In the A beds, as described in detail below, the secondary key component is selectively adsorbed. Desorbed secondary key component is evacuated from the A beds as stream 106 by vacuum blower 107, and passes as slightly pressurized stream 108 into a gas storage tank (not shown). A portion of this gas as stream 110 is returned to the A beds for purging and the remainder is withdrawn as stream 109 as secondary key component product. Depressurization and purge effluents from the A beds are withdrawn as stream 103, compressed in compressor 104, stored in a gas storage tank (not shown) and recycled to feed as stream 114.

The A beds effluent stream 221 passes into the second (B) beds 200 in which the tertiary components are adsorbed, and high purity primary key component is withdrawn as stream 201. Secondary and tertiary components are desorbed from the B beds and are discharged as waste or fuel streams 116 and 208. A portion of stream 201 is taken as stream 204 and passed to the B beds for pressurization through control valve 205 and for purging through pressure reducing valve 206. Primary key component product is withdrawn as stream 202. Pressure equalization gas and repressurization gas flows between the A and B beds are shown as stream 210.

Figure 2:
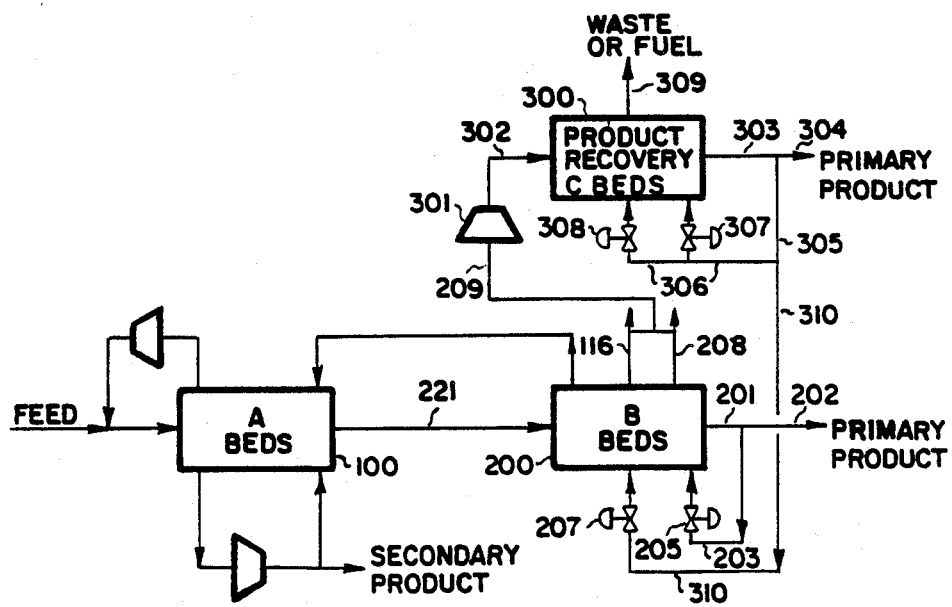
FIG. 2 is a schematic flow diagram of the present invention showing additional primary product recovery by a set of third (C) beds.

In an alternate embodiment, additional primary key component is recovered as shown in FIG. 2. Waste gas streams 116 and 208 from the depressurization and purge steps of the B beds are combined in stream 209 and compressed in compressor 301, and are passed to a gas storage tank (not shown). Gas from the tank as stream 302 passes into product recovery (C) beds 300 in which remaining secondary and tertiary components are selectively adsorbed as described in more detail below.

Desorbed secondary and tertiary components in stream 309 are sent to waste or used as fuel. Additional recovered primary key component, stream 303, is used in part as stream 305 for purging and repressurization. Stream 306 passes to product recovery beds 300 as purge gas through pressure reduction valve 307 and as repressurization gas through flow control valve 308.

Additional primary key component is passed as stream 310 through pressure reduction valve 207 for purging of B beds 200. Optionally, a portion of stream 310 can be used as pressurization gas for an initial portion of repressurization step (6). Any remaining primary key component is taken as additional product as stream 304.

Figure 3:
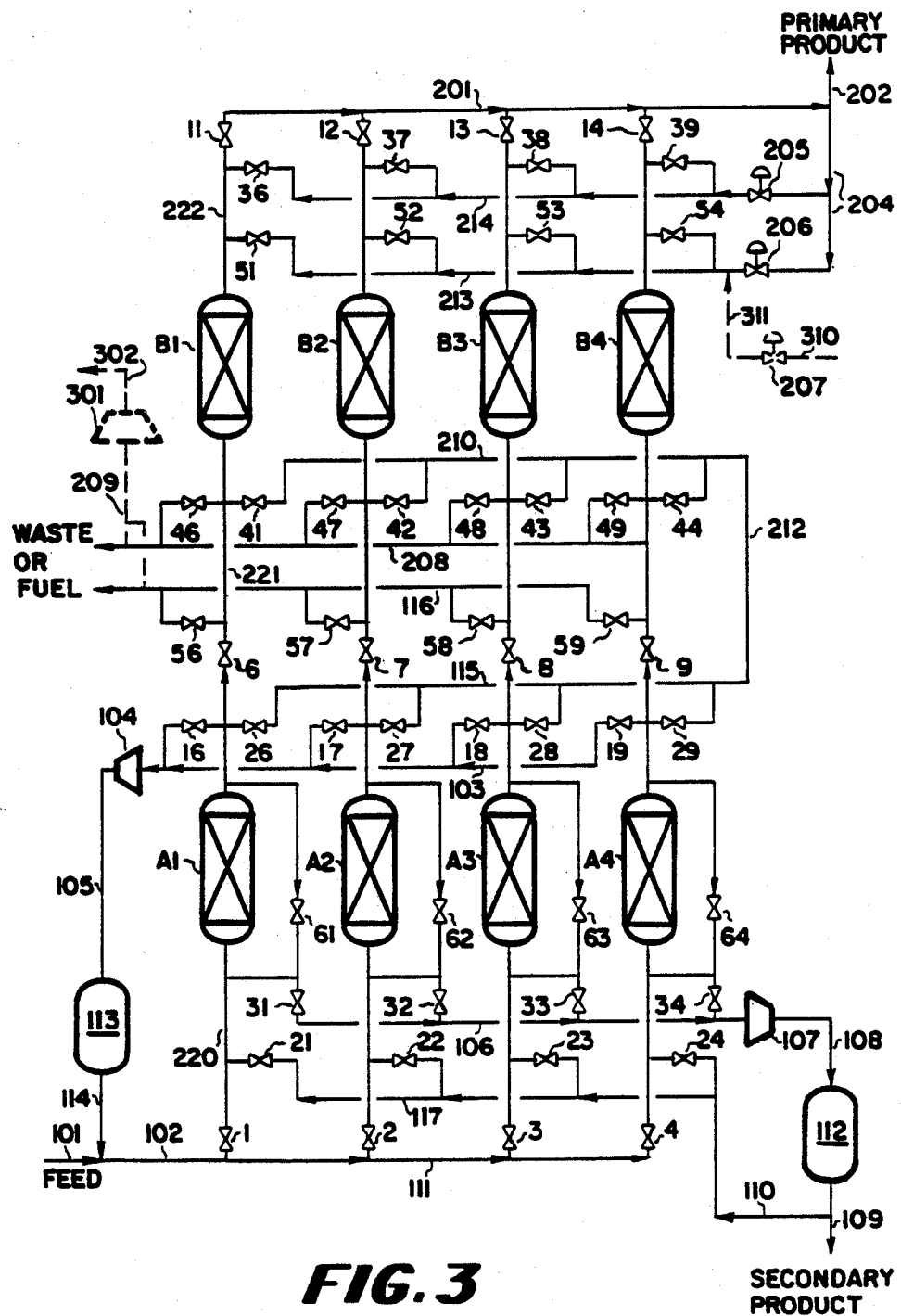
FIG. 3 is a process flow diagram of the first (A) beds and second (B) beds for the first and second embodiments of the present invention.

A detailed description of the first and second embodiments of the present invention, utilizing four A beds and four B beds as shown in FIG. 3, will now be given. The piping and valving in FIG. 3 are arranged such that any given pair of A and B beds (for example, A1 and B1) are in series flow communication during the adsorption step and repressurization step (6) as previously described. In addition, any pair of A beds, any pair of B beds, or any pair of A and B beds can be isolated and interconnected for pressure equalization as previously discussed.

In each of the two embodiments utilizing the process configuration of FIG. 3, each pair of A and B beds (A1 and B1, A2 and B2, A3 and B3, A4 and B4) are subjected in turn to the process cycle steps summarized earlier for one set of beds. The cyclic relationships of the process steps for all four pairs of beds are given in Tables 1 and 3. The following detailed process cycle steps will be given only for the first pair of beds A1 and B1.

The process cycle steps for the first embodiment of the present invention are given in Table 1.

Referring now to Table 1 and FIG. 3, the detailed process steps for this embodiment (using step designations previously defined) are as follows:

The adsorption step begins with the pressurized feed gas mixture between about 30 and 500 psia and about 40° to 200° F. entering through line 101, combining with pressurized recycle stream 114, and the combined stream 102 passing into manifold 111. Feed gas passes through valve 1, line 220, and adsorbent bed A1 in which secondary key component is selectively adsorbed. Effluent from bed A1 passes through valve 6, line 221, and adsorbent bed B1 in which tertiary components are selectively adsorbed. Primary key component now substantially free of secondary and tertiary components passes through line 222, valve 11, and manifold 201, and exits the system as product in line 202. During this adsorption step, valves 21, 31, 61, 16, 26, 56, 46, 41, 51, 36, 12, 13, and 14 are closed as shown in the valve sequence chart in Table 2. Flow is continued for a predetermined cycle time or until the concentration of secondary key

TABLE 1

PROCESS CYCLE STEPS
(Embodiment #1)

| TIME PERIOD BED → | A1 | A2 | A3 | A4 | B1 | B2 | B3 | B4 |
|---|---|---|---|---|---|---|---|---|
| 1 | A | PE1 | EV | DP | A | PU | DP | PE1 |
| 2 | A | I | EV | DP | A | PE2 | PU | PE2 |
| 3 | A | RP | EV | DP | A | RP | PU | DP |
| 4 | A | RP | EV | LPP | A | RP | PU | DP |
| 5 | DP | A | PE1 | EV | PE1 | A | PU | DP |
| 6 | DP | A | I | EV | PE2 | A | PE2 | PU |
| 7 | DP | A | RP | EV | DP | A | RP | PU |
| 8 | LPP | A | RP | EV | DP | A | RP | PU |
| 9 | EV | DP | A | PE1 | DP | PE1 | A | PU |
| 10 | EV | DP | A | I | PU | PE2 | A | PE2 |
| 11 | EV | DP | A | RP | PU | DP | A | RP |
| 12 | EV | LPP | A | RP | PU | DP | A | RP |
| 13 | PE1 | EV | DP | A | PU | DP | PE1 | A |
| 14 | I | EV | DP | A | PE2 | PU | PE2 | A |
| 15 | RP | EV | DP | A | RP | PU | DP | A |
| 16 | RP | EV | LPP | A | RP | PU | DP | A |

A = Adsorption
DP = Depressurization (Steps 1 and 4)
LPP = Low Pressure Purge (Step 2)
EV = Evacuation (Step 3)
PE1 = First Pressure Equalization (Steps 1a, 3a)
PE2 = Second Pressure Equalization (Steps 1b, 5a)
PU = Purge (Step 5)
RP = Repressurization (Step 6)
I = Idle

TABLE 2

VALVE SEQUENCE CHART
EMBODIMENT #1
(FIG. 3)

| Valve # | 1 | 2 | 3 | 4 | 21 | 22 | 23 | 24 | 31 | 32 | 33 | 34 | 61 | 62 | 63 | 64 | 16 | 17 | 18 | 19 | 26 | 27 | 28 | 29 | 6 | 7 |
|---|---|---|---|---|---|---|---|---|---|---|---|---|---|---|---|---|---|---|---|---|---|---|---|---|---|---|
| Time, Minutes | | | | | | | | | | | | | | | | | | | | | | | | | | |
| 0–1 | 0 | | | | | | | | 0 | | | | 0 | | | | 0 | | | | 0 | 0 | | | 0 | |
| 1–2 | 0 | | | | | | | | 0 | | | | 0 | | | | 0 | | | | 0 | | | | 0 | |
| 2–3 | 0 | | | | | | | | 0 | | | | 0 | | | | 0 | | | | 0 | | | | 0 | 0 |
| 3–4 | 0 | | | | | | | 0 | 0 | | | | 0 | | | | 0 | | | | 0 | | | | 0 | 0 |
| 4–5 | | 0 | | | | | | | | 0 | | | | 0 | 0 | | | | | | | 0 | | | | 0 |
| 5–6 | | 0 | | | | | | | | 0 | | | | 0 | 0 | | | | | | | | | | | 0 |
| 6–7 | | 0 | | | | | | | | 0 | | | | 0 | 0 | | | | | | | | | | | 0 |
| 7–8 | | 0 | | 0 | | | | | | 0 | | | | 0 | 0 | | | | | | | | | | | 0 |
| 8–9 | | | 0 | | | | 0 | | | | 0 | | 0 | | | | | 0 | | | | | 0 | | | |
| 9–10 | | | 0 | | | | 0 | | | | 0 | | 0 | | | | | 0 | | | | | | | | |
| 10–11 | | | 0 | | | | 0 | | | | 0 | | 0 | | | | | 0 | | | | | | | | |
| 11–12 | | | 0 | | 0 | | 0 | | | | 0 | | 0 | | | | | 0 | | | | | | | | |
| 12–13 | | | | 0 | | 0 | | | | | | 0 | | 0 | | | | | 0 | | 0 | 0 | | | | |
| 13–14 | | | | 0 | | 0 | | | | | | 0 | | 0 | | | | | 0 | | | 0 | | | | |
| 14–15 | | | | 0 | | 0 | | | | | | 0 | | 0 | | | | | 0 | | | | | 0 | | |
| 15–16 | | | | 0 | | 0 | 0 | | | | | 0 | | 0 | | | | | 0 | | | | | 0 | | |

| Valve # | 8 | 9 | 56 | 57 | 58 | 59 | 46 | 47 | 48 | 49 | 41 | 42 | 43 | 44 | 51 | 52 | 53 | 54 | 36 | 37 | 38 | 39 | 11 | 12 | 13 | 14 |
|---|---|---|---|---|---|---|---|---|---|---|---|---|---|---|---|---|---|---|---|---|---|---|---|---|---|---|
| Time, Minutes | | | | | | | | | | | | | | | | | | | | | | | | | | |
| 0–1 | | | | 0 | | 0 | | | | | | 0 | | | | | 0 | | | 0 | | 0 | | | | |
| 1–2 | | | | | 0 | | | | 0 | 0 | | 0 | | | | | | | | 0 | | 0 | | | | |
| 2–3 | | | | | 0 | | | | 0 | | | | | 0 | | | | | | 0 | | 0 | | | | |
| 3–4 | | | | | 0 | | | | 0 | | | | | 0 | | | | | | 0 | | 0 | | | | |
| 4–5 | | | | | 0 | | | | 0 | | | | | | | | | | 0 | | 0 | | | | | |

TABLE 2-continued

VALVE SEQUENCE CHART
EMBODIMENT #1
(FIG. 3)

| Time | | | | | | | | | | | | | | |
|------|---|---|---|---|---|---|---|---|---|---|---|---|---|---|
| 5-6   |   |   |   |   |   | O | O |   | O |   |   |   | O | O |
| 6-7   | O | O |   |   |   |   | O |   |   |   | O |   | O | O |
| 7-8   | O | O |   |   |   |   | O |   |   |   | O |   | O | O |
| 8-9   | O | O |   |   |   |   | O | O |   |   | O |   | O |   | O |
| 9-10  | O |   |   |   | O |   |   | O | O |   | O |   |   |   | O |
| 10-11 | O | O | O | O |   |   |   |   |   | O | O |   |   |   | O |
| 11-12 | O | O | O | O |   |   |   |   |   | O | O |   |   |   | O |
| 12-13 |   | O | O |   | O |   |   |   | O |   | O |   |   |   | O |
| 13-14 |   | O |   |   | O | O | O |   |   |   |   | O |   |   | O |
| 14-15 |   | O |   | O | O |   |   |   |   | O |   | O |   |   | O |
| 15-16 |   | O |   | O | O |   |   |   |   | O |   | O |   |   | O |

O - Valve Open, Otherwise Closed component in the effluent from bed A1 or the concentration of at least one tertiary component in the effluent from bed B1 reach predetermined levels. Beds A1 and B1 are isolated, ending the adsorption step, by closing valves 1, 6, and 11. Feed gas flow is switched to a second set of beds A2 and B2 by opening valves 2, 7, and 12. Bed A1 is next depressurized (step (1)) to about 15 psia by opening valve 16; desorbed and void space gas passes through manifold 103 and is compressed by compressor 104 and passed through line 105 into gas storage tank 113 for recycle through line 114 to feed line 101.

At the same time, bed B1 is depressurized (step (1a)) by connecting bed B1 with bed A3 (which has completed its evacuation step) by opening valves 41 and 28 thus causing desorbed and void space gas to flow from bed B1 through manifold 210, line 212, and manifold 115 into bed A3 until the pressures in both beds are equalized at a first intermediate pressure which is determined by the initial pressures in beds B1 and A3. Bed B1 is then further depressurized (step (1b)) by closing valve 28 and opening valve 43, which causes desorbed and void space gas to flow from bed B1 through manifold 210 into bed B3 until the pressures in both beds are equalized at a second intermediate pressure. This step is terminated by closing valves 41 and 43. During this step, the depressurization of bed A1 (step (1)) continues. Next, bed B1 is further depressurized (step (4)) by withdrawing additional desorbed and void space gas by opening valve 56 and allowing the pressure in bed B1 to decrease to about 15 psia. The withdrawn gas from this step through manifold 116 can be used for fuel or for other purposes. While this step continues, depressurization of bed A1 (step (1)) is completed by closing valve 16, and bed A1 is purged (step (2)) by opening valve 21 and passing high purity secondary key component from gas storage tank 112, through line 110 and manifold 117, through now opened valve 21, through line 220 and bed A1, and through valve 16. The purge effluent stream passes into manifold 103, compressor 104, line 105, and gas storage tank 113 from which it passes through line 114 and is recycled to feed line 101. This purge step displaces void space gas and any adsorbed primary and tertiary components present, and is continued for a predetermined cycle time or until the concentration of secondary key component in the purge stream effluent reaches a predetermined level. This step is terminated by closing valves 21 and 16.

Next, bed A1 is evacuated (step (3)) by opening valves 31 and 61 whereby gas from Bed A1 is pulled through manifold 106 by means of vacuum blower 107, and then the gas passes through line 108 into secondary key component storage tank 112. Part of the gas from this tank is taken through line 110 for use in purge step (2); the remainder flows through line 109 as secondary product. During this evacuation step, the depressurization of bed B1 (step (4)) is completed by closing valve 56. Next, bed B1 is purged (step (5)) at between 15 and 30 psia by passing a stream of very high purity primary key component product through manifold 204, pressure reduction valve 206, manifold 213, and valve 51, line 222, and then through bed B1, valve 46 and manifold 208. During this purge step, bed B1 is cleaned by desorbing remaining adsorbed secondary (if present) and tertiary components. Alternatively, some or all of the purge gas for bed B1 can be supplied from the additional primary key component recovered in the third bed of adsorbent as discussed below by passing this additional primary key component through line 310, control valve 207, line 311, and into manifold 213. The purge step continues for a predetermined amount of time such that bed B1 is sufficiently free of adsorbed impurities. Purge effluent can be used as fuel or for other purposes. During this purge step, evacuation of bed A2 (step (3)) is completed when the pressure in the bed reaches between about 40 and 200 mm Hg, and valves 31 and 61 are closed. Bed A1 is then pressurized (step (3a)) by opening valves 26 and 43 so that gas from bed B3 (which has just completed its adsorption step) flows through manifold 210, line 212 and manifold 115 into bed A1. This equalizes the pressures in beds A1 and B3 at the first intermediate pressure. Valve 26 is closed, and valves 46 and 51 are also closed to end the purge (step (5)) of bed B1. Next, bed B1 is pressurized (step (5a)) by opening valve 41 (valve 43 is still open) so that gas from bed B3 (which has just completed step (1a)) flows through manifold 210 and into bed B1. This equalizes the pressures in beds B1 and B3 at the second intermediate pressure. Finally beds A1 and B1 are pressurized (step 6). Valves 41 and 43 are closed, valve 36 is opened, and high purity primary product flows through manifold 204, flow control valve 205, and manifold 214, valve 36, line 222, and into bed B1. Valve 6 is opened, and gas flows from bed B1 into bed A1. At the completion of this step, valve 36 is closed, and beds A1 and B1 are at the pressure of the adsorption step, and another cycle is ready to begin.

The second embodiment of the present invention, as the first embodiment, utilizes four A beds and four B beds as shown in FIG. 3. The process cycle steps for this second embodiment are summarized in Table 3. Referring now to FIG. 3 and Table 3, the process steps (using step designations previously defined) are as follows:

The adsorption step begins with the pressurized feed gas mixture entering through line 101, combining with pressurized recycle stream 114, and the combined stream 102 passing into manifold 111. Feed gas between about 30 and 500 psia and about 40° to 200° F. passes through valve 1, line 220, and adsorbent (step (2)) at near atmospheric pressure. In this step, high purity secondary key component is passed from gas storage tank 112, through line 110 and manifold 117, through now opened valve 21, through line 220 and bed

TABLE 3

PROCESS CYCLE STEPS
(Embodiment #2)

| TIME PERIOD BED → | A1 | A2 | A3 | A4 | B1 | B2 | B3 | B4 |
|---|---|---|---|---|---|---|---|---|
| 1 | A | PE3 | EV | DP | A | PU | PE3 | I |
| 2 | A | I | EV | DP | A | PE1 | DP | PE1 |
| 3 | A | PE2 | EV | DP | A | I | PU | PE2 |
| 4 | A | RP | EV | LPP | A | RP | PU | I |
| 5 | DP | A | PE3 | EV | I | A | PU | PE3 |
| 6 | DP | A | I | EV | PE1 |  | PE1 | DP |
| 7 | DP | A | PE2 | EV | PE2 | A | I | PU |
| 8 | LPP | A | RP | EV | I | A | RP | PU |
| 9 | EV | DP | A | PE3 | PE3 | I | A | PU |
| 10 | EV | DP | A | I | DP | PE1 | A | PE1 |
| 11 | EV | DP | A | PE2 | PU | PE2 | A | I |
| 12 | EV | LPP | A | RP | PU | I | A | RP |
| 13 | PE3 | EV | DP | A | PU | PE3 | I | A |
| 14 | I | EV | DP | A | PE1 | DP | PE1 | A |
| 15 | PE2 | EV | DP | A | I | PU | PE2 | A |
| 16 | RP | EV | LPP | A | RP | PU | I | A |

A = Adsorption
DP = Depressurization (Steps 1 and 4)
LPP = Low Pressure Purge (Step 2)
EV = Evacuation (Step 3)
PE1 = First Pressure Equalization (Steps 1a, 5a)
PE2 = Second Pressure Equalization (Steps 1b, 3b)
PE3 = Third Pressure Equalization (Steps 1c, 3a)
PU = Purge (Step 5)
RP = Repressurization (Step 6)
I = Idle bed A1 in which secondary key component is selectively adsorbed. Effluent from bed A1 passes through valve 6, line 221, and adsorbent bed B1 in which tertiary components are selectively adsorbed. Primary key component now substantially free of secondary and tertiary components passes through line 222, valve 11, manifold 201, and exits the system as product in line 202. During this adsorption step, valves 21, 31, 61, 16, 26, 56, 41, 46, 51, 36, 12, 13, and 14 are closed. Flow is continued for a predetermined cycle time or until the concentration of secondary key component in the effluent from bed A1 or the concentration of at least one tertiary component in the effluent from bed B1 reach predetermined levels. Beds A1 and B1 are then isolated, ending the adsorption step, by closing valves 1, 6, and 11. Feed gas flow is switched to a second set of beds A2 and B2 by opening valves 2, 7, and 12. Bed A1 is next depressurized (step (1)) to about 15 psia by opening valve 16. Desorbed and void space gas passes through manifold 103 and is compressed by compressor 104 and passed through line 105 into gas storage tank 113 for recycle through line 114 to feed line 101. While this step continues, bed B1 is depressurized (step (1a)) by connecting it with bed B3 (which has completed purge step (5)) by opening valves 41 and 43 thus causing desorbed and void space gas to flow from bed B1 through manifold 210 into bed B3 until the pressures in both beds are equalized at a first intermediate pressure which is determined by the initial pressure in beds B1 and B3. Then, while depressurization step (1) continues, bed B1 is further depressurized (step (1b)); to accomplish this, bed B1 is connected with bed A3 (which has completed its pressurization step (3a)) by closing valve 43 and opening valve 28. This causes desorbed and void space gas to flow from bed B1 through manifold 210, line 212 and manifold 115 into bed A3 until the pressures in both beds are equalized at a second intermediate pressure. This step is terminated by closing valve 28. At this point, bed A1 is purged A1, and through valve 16. The purge effluent stream passes into manifold 103, compressor 104, line 105, and gas storage tank 113 from which it passes through line 114 and is recycled to feed line 101. This purge step displaces void space gas and any adsorbed tertiary components present, and is continued for a predetermined cycle time or until the concentration of secondary key component reaches a predetermined level. This step is terminated by closing valves 21 and 16. Next, bed A1 (now essentially saturated with secondary key component) is evacuated (step (3)) by opening valves 31 and 61 whereby gas from bed A1 is pulled through manifold 106 by means of vacuum blower 107, and passing the gas through line 108 into secondary key component storage tank 112. Part of the gas from this tank is taken through line 110 for use in purge step (2); the remainder flows through line 109 as secondary product.

Simultaneously with the start of evacuation step (3), bed B1 is further depressurized (step (1c)) by connecting it with bed A4 (which has completed its evacuation step (3)) by opening valve 29 (valve 41 remains open from step (1b)). This causes desorbed and void space gas to flow from bed B1 through manifold 210, line 212, and manifold 115 into bed A4 until the pressure in both beds are equalized at a third intermediate pressure. This step is terminated by closing valves 29 and 41. While evacuation step (3) continues, bed B1 is further depressurized (step (4)) by withdrawing additional desorbed and void space gas by opening valve 56 and allowing the pressure in bed B1 to decrease to about 15 psia. The withdrawn gas from this step through manifold 116 can be used for fuel or for other purposes. This step is completed by closing valve 56. This step is completed by closing valve 56.

Next, while evacuation step (3) continues, bed B1 is purged (step (5)) at between 15 and 30 psia by passing a stream of very high purity primary key component through manifold 204, pressure reduction valve 206, manifold 213, and valve 51, line 222, and then through bed B1, valve 46 and manifold 208.

During this purge step, bed B1 is cleaned by desorbing remaining adsorbed secondary (if present) and tertiary components. Alternatively, some or all of the purge gas for bed B1 can be supplied from the additional primary key component recovered in the third bed of adsorbent as discussed below by passing this additional primary key component through line 310, control valve 207, line 311, and into manifold 213. The purge step continues for a predetermined amount of time such that bed B1 is sufficiently free of adsorbed impurities. Valves 46 and 51 are then closed. While purge step (5) continues, evacuation step (3) is completed when the pressure in bed A1 reaches between about 40 and 200 mm Hg by closing valves 31 and 61; bed A1 is then pressurized (step (3a)) by opening valves 26 and 42 so that gas from bed B2 (which has just completed its depressurization step (1b)) flows through manifold 210, line 212, and manifold 115 into bed A1. This equalizes the pressures in beds A1 and B2 at the third intermediate pressure. Valve 42 is then closed to end the step. At this time, purge step (5) is also ended by closing valves 46 and 51. Bed B1 is then pressurized (step (5a)) by connecting it with bed B3 (which has just completed its adsorption step) by opening valves 41 and 43. Desorbed and void space gas flows from bed B3 through manifold 210 and into bed B1 until the pressure in both the beds are equalized at the first intermediate pressure. Valve 41 is then closed. Bed A1 is then pressurized (step (3b)) by connecting it with bed B3 which has just completed its depressurization step (1a) by opening valve 26. Gas flows from bed B3 through manifold 210, line 212 and manifold 115 into bed A1, which equalizes the pressures in beds A1 and B3 at the second intermediate pressure. Valves 26 and 43 are then closed to complete the step. Finally, beds A1 and B1 are pressurized (step (6)). Valve 36 is opened and high purity primary product flows through manifold 204, flow control valve 205, manifold 214, valve 36, line 222, and into bed B1. Valve 6 also is opened, and gas flows from bed B1 into bed A1. At the completion of this step, valve 36 is closed, and beds A1 and B1 are at the pressure of adsorption step and another cycle is ready to begin.

Figure 5:
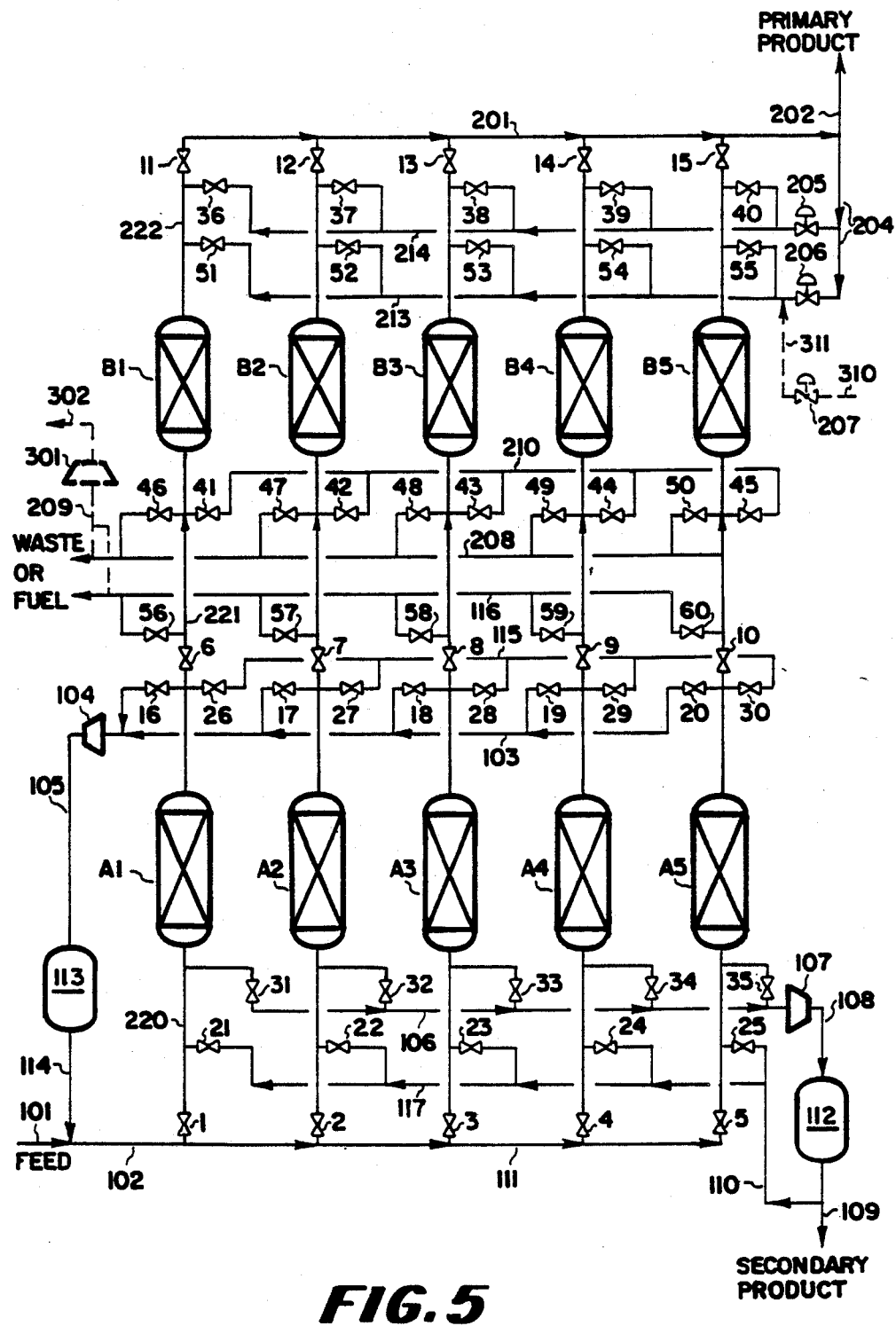
FIG. 5 is a process flow diagram of the first (A) beds and second (B) beds for the fourth embodiment of the present invention.
Figure 4:
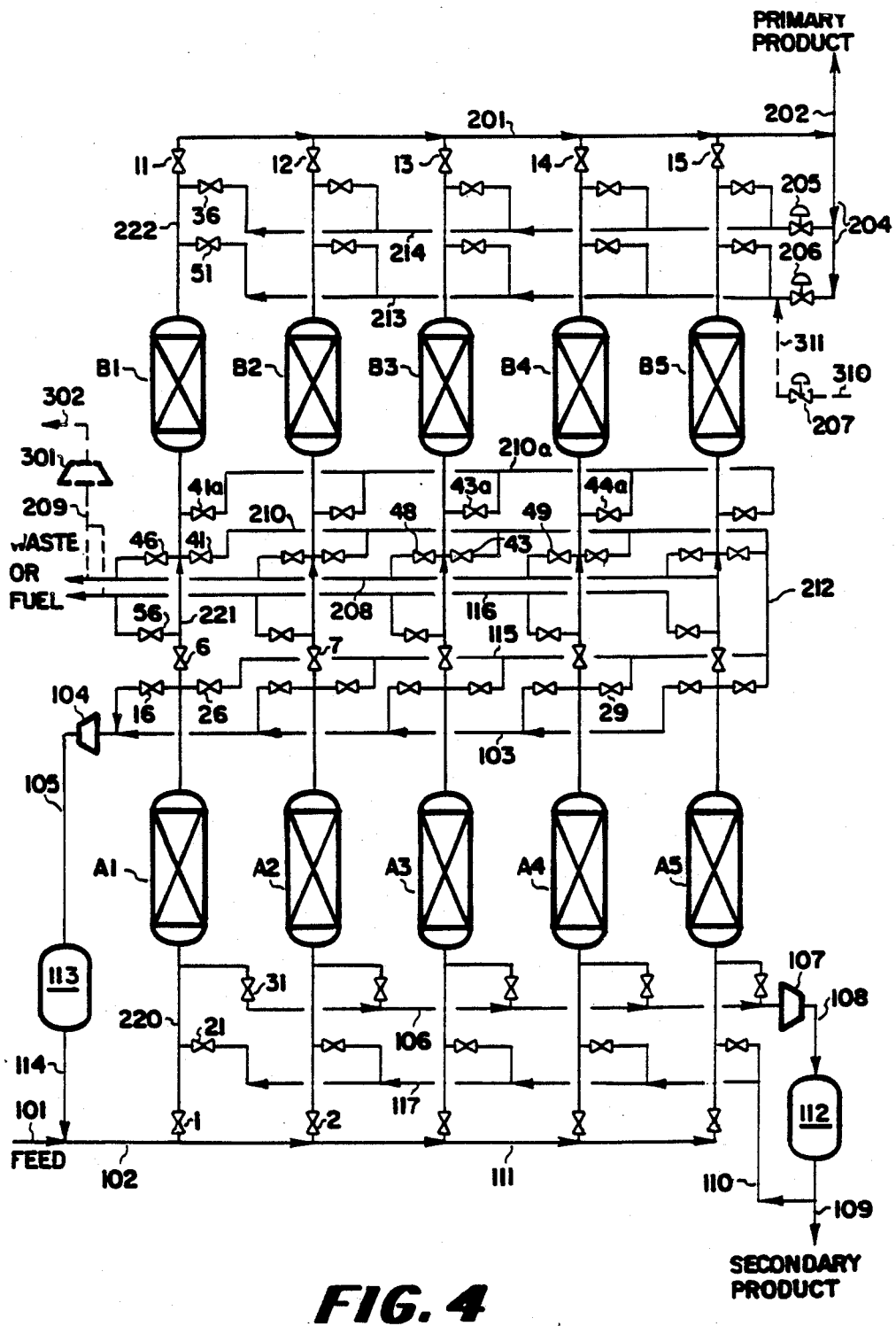
FIG. 4 is a process flow diagram of the first (A) beds and second (B) beds for the third embodiment of the present invention.

A detailed description of the third and fourth embodiments, utilizing five A beds and five B beds as shown in FIGS. 4 and 5, will now be given. The piping and valving in FIGS. 4 and 5 are arranged such that any given pair of A and B beds (for example, A1 and B1) are in series flow communication during the adsorption step and repressurization step (6) as previously described. Any pair of A beds and any pair of B beds can be isolated and interconnected for pressure equalization as previously discussed. In FIG. 4, any pair of A and B beds also can be isolated and interconnected for pressure equalization as previously discussed.

In each of the two embodiments utilizing the respective process configurations of FIGS. 4 and 5, each pair of A and B beds (A1 and B1, A2 and B2, A3 and B3, A4 and B4, A5 and B5) are subjected in turn to the process cycle steps summarized earlier for one pair of beds. The cyclic relationships of the process steps for all five pairs of beds are given in Tables 4 and 5. The following detailed process cycle steps will be given only for the first pair of beds A1 and B1.

The process cycle steps for the third embodiment of the present invention are given in Table 4. Referring now to Table 4 and FIG. 4, the detailed process steps for this embodiment (using step designations previously defined) are as follows.

The adsorption step begins by passing the pressurized feed gas mixture gas between about 30 and 500 psia and about 40° to 300° F. through line 101, combining it with pressurized recycle stream 114, and passing the combined stream 102 into manifold 111. Feed passes through valve 1, line 220, and adsorbent bed A1 in which secondary key component is selectively adsorbed. Effluent feed bed A1 passes through valve 6, line 221, and adsorbent bed B1 in which tertiary components are selectively adsorbed. Primary key component now substantially free of secondary and tertiary components passes through line 222, valve 11, manifold 201, and exits the system as product in line 202. During this adsorption step, valves 21, 31, 16, 26, 56, 46, 41, 41a, 51, 36, 12, 13, 14, and 15 are closed. Flow is continued for a predetermined cycle time or until the concentration of secondary key component in the effluent from bed A1 or the concentration of at least one tertiary component in the effluent from bed B1 reach predetermined levels. Beds A1 and B1 are then isolated, ending the adsorption step, by closing valves 1, 6, and 11. Feed gas flow is switched to a second set of beds A2 and B2 by opening valves 2, 7, and 12. Bed A1 is next depressurized (step (1)) in which valve 16 is opened and the bed is depressurized to about 15 psia. This desorbed and void space gas passes

TABLE 4

PROCESS CYCLE STEPS
(Embodiment #3)

| TIME PERIOD | BED → A1 | A2 | A3 | A4 | A5 | B1 | B2 | B3 | B4 | B5 |
|---|---|---|---|---|---|---|---|---|---|---|
| 1 | A | LPPE | EV | LPP(E) | DP | A | PE2 | PU | PE2 | I |
| 2 | A | PE3 | EV | LPP | DP | A | PE1 | PU | PE3 | PE1 |
| 3 | A | I | EV | LPP | DP | A | PE1 | PU | DP | PE1 |
| 4 | A | RP | EV | LPP | DP | A | RP | PE2 | PU | PE2 |
| 5 | DP | A | LPPE | EV | LPP(E) | I | A | PE2 | PU | PE2 |
| 6 | DP | A | PE3 | EV | LPP | PE1 | A | PE1 | PU | PE3 |
| 7 | DP | A | I | EV | LPP | PE1 | A | PE1 | PU | DP |
| 8 | DP | A | RP | EV | LPP | PE2 | A | RP | PE2 | PU |
| 9 | LPP(E) | DP | A | LPPE | EV | PE2 | I | A | PE2 | PU |
| 10 | LPP | DP | A | PE3 | EV | PE3 | PE1 | A | PE1 | PU |
| 11 | LPP | DP | A | I | EV | DP | PE1 | A | PE1 | PU |
| 12 | LPP | DP | A | RP | EV | PU | PE2 | A | RP | PE2 |
| 13 | EV | LPP(E) | DP | A | LPPE | PU | PE2 | I | A | PE2 |
| 14 | EV | LPP | DP | A | PE3 | PU | PE3 | PE1 | A | PE1 |
| 15 | EV | LPP | DP | A | I | PU | DP | PE | A | PE1 |
| 16 | EV | LPP | DP | A | RP | PE2 | PU | PE2 | A | RP |

TABLE 4-continued

PROCESS CYCLE STEPS (Embodiment #3)

| TIME PERIOD | BED → A1 | A2 | A3 | A4 | A5 | B1 | B2 | B3 | B4 | B5 |
|---|---|---|---|---|---|---|---|---|---|---|
| 17 | LPPE | EV | LPP(E) | DP | A | PE2 | PU | PE2 | I | A |
| 18 | PE3 | EV | LPP | DP | A | PE1 | PU | PE3 | PE1 | A |
| 19 | I | EV | LPP | DP | A | PE1 | PU | DP | PE1 | A |
| 20 | RP | EV | LPP | DP | A | RP | PE2 | PU | PE2 | |

A = Adsorption
DP = Depressurization (Steps 1 and 4)
LPP = Low Pressure Purge (Step 2)
LPP(E) = Low Pressure Purge with Effluent to Equalization (Step 2)
LPPE = Low Pressure Purge Equalization (Step 3a)
EV = Evacuation (Step 3)
PE1 = First Pressure Equalization (Steps 1a, 5b)
PE2 = Second Pressure Equalizaton (Steps 1b, 5a)
PE3 = Third Pressure Equaization (Steps 1c, 3b)
PU = Purge (Step 5)
RP = Repressurization (Step 6)
I = Idle through manifold 103 and is compressed by compressor 104 and passed through line 105 into gas storage tank 113 for recycle through line 114 to feed line 101.

While this step continues, bed B1 is depressurized (step (1a)) by connecting it with bed B3 by opening valves 41a and 43a. Other valves associated with bed B3 are closed. Gas then flows from bed B1 through manifold 210a into bed B3 (which has just completed its pressurization step (5a) and is initially at the second intermediate pressure) until the pressures in both beds equalize at the first intermediate pressure which is determined by the initial pressures in beds B1 and B3. Valve 43a is then closed.

While depressurization step (1) continues, bed B1 is further depressurized (step (1b)) by connecting it with bed B4 (which has just completed its purge step (5)) by opening valve 44a (valve 41a is already open). Other valves associated with bed B4 were closed previously.ABthen flows from bed B1 through manifold 210a and into bed B4 until the pressures in both beds equalize at a second intermediate pressure. Following depressurization step (1) of bed A1, bed A1 is purged (step (2)) by passing high purity secondary key component from gas storage tank 112, through line 110 and manifold 117, through now opened valve 21, through line 220 and bed A1, and through valve 16. The purge effluent stream passes into manifold 103, compressor 104, line 105, and gas storage tank 113 from which it passes through line 114 and is recycled to feed line 101. This purge step displaces void space gas and any adsorbed primary or tertiary components present, and is continued for a predetermined cycle time or until the concentration of secondary key component in the purge effluent reaches a predetermined level. During purge step (2), depressurization step (1b)) is ended by closing valves 41a and 44a, and bed B1 is further depressurized (step (1c)) by connecting it with bed A4 (which has just completed its pressurization step (3a) and is at the fourth intermediate pressure) by opening valves 29 and 41. Gas then flows through manifold 210, line 212, and manifold 115 into bed A4 until the pressures in both beds are equalized at the third intermediate pressure. Valves 29 and 41 are then closed. While purge step (2) of bed A1 continues, bed B1 is further depressurized (step (4)) to near-atmospheric pressure by opening valve 56 which causes additional desorbed and void space gas to flow from bed B1 and through manifold 116. This withdrawn gas is used for fuel or for other purposes. When this further depressurization is complete, valve 56 is closed and bed B1 is purged (step (5)) at between 15 and 30 psia by opening valve 51 and passing a stream of very high purity primary key component through manifold 204, pressure reduction valve 206, manifold 213, valve 51, line 222, and then through bed B1, valve 46, and manifold 208. Alternatively, some or all of the purge gas for bed B1 can be supplied from the additional primary key component recovered in the third bed of adsorbent as discussed below by passing this additional primary key component through line 310, control valve 207, line 311, and into manifold 213. During this purge step, bed B1 is cleaned by desorbing remaining adsorbed secondary and tertiary components. The purge step continues for a predetermined amount of time such that bed B1 is sufficiently free of adsorbed impurities. Purge effluent can be used as fuel or for other purposes. While purge step (5) of bed B1 continues, purging of bed A1 (step (2)) is completed by closing valves 16 and 21, and the bed is then evacuated by opening valve 31 whereby gas is pulled through manifold 106 by means of vacuum blower 107, and passing the gas through line 108 into secondary key component storage tank 112. Part of the gas from this tank is taken through line 110 for use in purge step (2); the remainder flows through line 109 as secondary product.

While evacuation of bed A1 continues, purging of bed B1 (step (5)) is completed by closing valves 51 and 46. Bed B1 is then pressurized (step (5a)) by opening valves 41a and 43a to connect it with bed B3 (which has just completed depressurization step (1a)). Gas flows from bed B3 through manifold 210a and into bed B1, which equalizes the pressures in both beds at the second intermediate pressure. During this pressurization of bed B1, evacuation of bed A1 (step (3)) is completed by closing valve 31. Bed A1 is next pressurized (step (3a)) to the fourth intermediate pressure by opening valve 16 whereby a portion of the low pressure purge effluent from bed A3 (now on its purge step (2)) flows from manifold 103 into bed A1. Valve 16 is then closed to complete this pressurization step, and valve 43a is also closed to complete pressurization step (5a) of bed B1. Next, bed B1 is further pressurized (step (5b)) to the first intermediate pressure by opening valve 44a whereby gas flows from bed B4 (which has completed its adsorption step) through manifold 210a and open valve 41a into bed B1. At the same time, bed A1 is further pressurized (step (3b)) by closing valve 16 to complete step (3a) and opening valves 26 and 43 to connect bed A1 with bed B3 which has completed its depressurization step (1b). Gas flows from bed B3 through manifold 210, line 212, and manifold 115 into bed A1 and the pressures in both beds are equalized at the third intermediate pressure. This step is completed by closing valves 26 and 43, while further pressurization of bed B1 (step (5b)) continues.

process steps for this embodiment (using step designations previously defined) are as follows.

The adsorption step begins by passing the pressurized feed gas mixture through line 101, combining it with pressurized recycle stream 114, and passing the combined stream 102 into manifold 111. Feed gas between TABLE 5
PROCESS CYCLE STEPS
(Embodiment #4)

| TIME PERIOD BED → | A1 | A2 | A3 | A4 | A5 | B1 | B2 | B3 | B4 | B5 |
|---|---|---|---|---|---|---|---|---|---|---|
| 1 | A | LPPE | EV | LPP(E) | I | A | PE2 | PU | PE2 | I |
| 2 | A | PEA | EV | LPP | PEA | A | PE1 | PU | DP | PE1 |
| 3 | A | I | I | EV | DP | A | PE1 | PU | DP | PE1 |
| 4 | A | RP | LPPE | EV | LPP(E) | A | RP | PE2 | PU | PE2 |
| 5 | I | A | LPPE | EV | LPP(E) | I | A | PE2 | PU | PE2 |
| 6 | PEA | A | PEA | EV | LPP | PE1 | A | PE1 | PU | DP |
| 7 | DP | A | I | I | EV | PE1 | A | PE1 | PU | DP |
| 8 | LPP(E) | A | RP | LPPE | EV | PE2 | A | RP | PE2 | PU |
| 9 | LPP(E) | I | A | LPPE | EV | PE2 | I | A | PE2 | PU |
| 10 | LPP | PEA | A | PEA | EV | DP | PE1 | A | PE1 | PU |
| 11 | EV | DP | A | I | I | DP | PE1 | A | PE1 | PU |
| 12 | EV | LPP(E) | A | RP | LPPE | PU | PE2 | A | RP | PE2 |
| 13 | EV | LPP(E) | I | A | LPPE | PU | PE2 | I | A | PE2 |
| 14 | EV | LPP | PEA | A | PEA | PU | DP | PE1 | A | PE1 |
| 15 | I | EV | DP | A | I | PU | DP | PE1 | A | PE1 |
| 16 | LPPE | EV | LPP(E) | A | RP | PE2 | PU | PE2 | A | RP |
| 17 | LPPE | EV | LPP(E) | I | A | PE2 | PU | PE2 | I | A |
| 18 | PEA | EV | LPP | PEA | A | PE1 | PU | DP | PE1 | A |
| 19 | I | I | EV | DP | A | PE1 | PU | DP | PE1 | A |
| 20 | RP | LPPE | EV | LPP(E) | A | RP | PE2 | PU | PE2 | A |

A = Adsorption
DP = Depressurization (Steps 1 and 4)
LPP = Low Pressure Purge (Step 2)
LPP(E) = Low Pressure Purge with Effluent to Equalization (Step 2)
LPPE = Low Pressure Purge Equalization (Step 3a)
EV = Evacuation (Step 3)
PE1 = First Pressure Equalization (Steps 1b, 5b)
PE2 = Second Pressure Equalization (Steps 1c, 5a)
PEA = Pressure Equalization A Beds (Steps 1a, 3b)
PU = Purge (Step 5)
RP = Repressurization (Step 6)
I = Idle Next valves 41a and 44a are closed to complete pressurization of bed B1 to the first intermediate pressure. Finally, beds A1 and B1 are pressurized (step (6)) to the adsorption pressure. Valve 36 is opened and high purity primary product flows through manifold 204, flow control valve 205, manifold 214, valve 36, line 222, and into bed B1. Valve 6 is also opened, and gas flows from bed B1 into bed A1. At the completion of this step, valve 36 is closed, and beds A1 and B1 are at the pressure of adsorption step and another cycle is ready to begin.

Turning now to the fourth embodiment of the present invention, the process cycle steps are given in Table 5 and the process flow diagram is given in FIG. 5. The about 30 and 500 psia and about 40° to 200° F. passes through valve 1, line 220, and adsorbent bed A1 in which secondary key component is selectively adsorbed. Effluent from bed A1 passes through valve 6, line 221, and adsorbent bed B1 in which tertiary components are selectively adsorbed, Primary key component now substantially free of secondary and tertiary components passes through line 222, valve 11, manifold 201, and exits the system as product in line 202. During this adsorption step, valves 21, 31, 16, 26, 56, 46, 41, 51, 36, 12, 13, 14, and 15 are closed as shown in the valve sequence chart of Table 6. Flow is continued for a predetermined cycle time or until the concentration of secondary key component in the effluent from bed A1 or the concentration of at least one

TABLE 6
VALVE SEQUENCE CHART
EMBODIMENT #4
(FIG. 5)

VALVE #

| TIME (MINUTES) | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| 0-1 | o | | | | | | | | | | | | | | | | | | | | | | | | | | | | | |
| 1-2 | o | o | | | | | | | | | | | | | | | | | | | | | | | | | | | | |
| 2-3 | o | o | o | | | | | | | | | | | | | | | | | | | | | | | | | | | |
| 3-4 | o | | | o | o | o | | | | | | | | | | | | | | | | | | | | | | | | |
| 4-5 | | | | o | o | o | | | | | | | | | | | | | | | | | | | | | | | | |
| 5-6 | | | | | | o | o | o | | | | | | | | | | | | | | | | | | | | | | |
| 6-7 | | | | | | | o | o | o | | o | o | | | | | | | | | | | | | | | | | | |
| 7-8 | | | | | | | o | o | | | o | o | o | | | | | | | | | | | | | | | | | |
| 8-9 | | | | | | | | | o | | | o | | o | | | | | | | | | | | | | | | | |
| 9-10 | | | | | | | | | o | o | | | | o | o | o | | | | | | | | | | | | | | |
| 10-11 | | | | | | | | | o | o | o | | | | | o | o | | | | | | | | | | | | | |
| 11-12 | | | | | | | | | | o | o | | | o | | | | o | o | | | o | o | | | | | | | |
| 12-13 | | | | | | | | | | | | | | o | o | o | | o | o | | o | o | o | | | | | | | |
| 13-14 | | | | | | | | | | | | | | o | o | o | o | | | o | | | o | o | o | o | | | | |
| 14-15 | | | | | | | | | | | | | | | | | o | o | o | | | | | | o | o | o | | | |
| 15-16 | | | | | | | | | | | | | | | | | | o | | o | | | | o | | | | | o | |
| 16-17 | | | | | | | | | | | | | | | | | | o | o | | | | o | o | o | | | o | o | o |
| 17-18 | | | | | | | | | | | | | | | | | | | o | o | | | | | | | o | o | o | |
| 18-19 | | | | | | | | | | | | | | | | | | | | | o | | | | | | | o | o | o |
| 19-20 | | | | | | | | | | | o | | | | | | | | | | | | | o | | | o | | | |

VALVE #

| TIME (MINUTES) | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 |
|---|---|---|---|---|---|---|---|---|---|---|---|---|---|---|---|---|---|---|---|---|---|---|---|---|---|---|---|---|---|---|
| 0-1 | o | | | | | | | | | | | o | | | | | | | | | | | o | | | | | | | |
| 1-2 | o | o | | | | | | | | | | o | | | o | | | | | | | | o | | | | | | | |
| 2-3 | o | o | | | | | | | | | | o | | | o | | | | | | | | o | | | | | | | |
| 3-4 | | | | o | o | | o | | | | | | | o | | o | | | | | | | | o | | | | | | |
| 4-5 | | | | o | o | o | | | | | | | | o | o | | | | | | | | | o | o | | | | | |
| 5-6 | | | | | o | o | | | | | | | o | | o | o | | | | | | | | | o | o | | | | |
| 6-7 | | | | | | | | o | | | | | o | o | o | | o | | | | | | | | o | o | o | | | |
| 7-8 | | | | | | | | | o | | o | | | o | | | o | | | | | | | | | | o | | | |
| 8-9 | | | | | | | | | | | o | | o | | o | o | | o | o | | | | | | | | | o | | |
| 9-10 | | | | | | | | | | o | o | | | | o | | o | o | o | | o | | | | | | | o | o | |
| 10-11 | o | | | | | | | | | | | | | | | | | o | | | o | | o | o | o | | | | o | o |
| 11-12 | o | | | | | | | | | | | o | o | o | | | | | | | o | o | o | | o | o | o | o | | o |
| 12-13 | o | o | | | | | | | | | | o | o | o | o | o | | | | | o | o | | | | o | o | | o | o |
| 13-14 | | o | | | | | | | | | | | o | | o | | o | | o | | | o | | | | o | | o | | |
| 14-15 | | o | | | | | | | | | | | | o | | o | | o | | | | | | | | | | | | |
| 15-16 | | | | | | | | | | | | | | | | | | o | | o | | | | | | | | | | |
| 16-17 | | | | | | | | | | | | | | | | | | | | | | | | | | | | | | |
| 17-18 | | | o | | | | | | | | | | | | | | | | | | | | | | | | | | | |
| 18-19 | | | o | | | | | | | | | | | | | | | | | | | | | | | | | | | |
| 19-20 | | | o | | | o | | | | | | o | | | | | | | | | | | o | | | | | | | | o - Open, Otherwise Closed.

tertiary component in the effluent from bed B1 reach predetermined levels. Beds A1 and B1 are then isolated, ending the adsorption step, by closing valves 1, 6, and 11. Feed gas flow is switched to a second set of beds A2 and B2 by opening valves 2, 7, and 12.

Bed A1 is next depressurized (step (1a)) by connecting it with bed A3 (which has completed its pressurization step (3a)) by opening valves 26 and 28. Gas flows from bed A1 through manifold 115 and into bed A3 until the pressures in both beds are equalized at the first intermediate pressure. At the same time, bed B1 is depressurized (step (1b)) by connecting it with bed B3 (which has completed its pressurization step (5a)) by opening valves 41 and 43, causing gas to flow from bed B1 through manifold 210 into bed B3 until the pressures in both beds are equalized at the second intermediate pressure. While this depressurization step proceeds, depressurization of bed A1 (step (1a)) is completed by closing valves 26 and 28. Bed A1 is then further depressurized (step (1)) by opening valve 16 so that gas flows from bed A1 through manifold 103, compressor 104, line 105, and gas storage tank 113, from where it is recycled through line 114 to feed line 101. The step is completed when the pressure in bed A1 reaches about 15 psia. At the same time, depressurization of bed B1 (step (1b)) is completed by closing valve 43. Bed A1 is then purged (step (2)) by opening valve 21 and passing a stream of secondary key component product at about 15 psia from gas storage vessel 112, through line 110, manifold 117, valve 21, line 220, and through bed A1. Purge effluent passes through valve 16, compressor 104, line 105, and into gas storage vessel 113, from which gas is recycled through line 114 to feed line 101. As the purging of bed A1 begins, valve 44 is opened; bed B1 is further depressurized (step (1c)) by flowing gas from bed B1 through valve 41, manifold 210, and valve 44 into bed B4 until the pressures in both beds are equalized at the third intermediate pressure. Valves 41 and 44 are then closed to complete the depressurization step. While purging of bed A1 (step (2)) continues, bed B1 is further depressurized (step (4)) to near-atmospheric pressure by opening valve 56 so that gas flows from bed B1 through valve 56 and manifold 116. This depressurization gas is used as fuel or for other purposes. While bed B1 depressurization continues, purging of bed A1 (step (2)) is completed by closing valves 21 and 16. Bed A1 is then evacuated by opening valve 31 and pulling as through manifold 106 by vacuum blower 107, through line 108, and into gas storage vessel 112 from which a portion is withdrawn through line 109 as secondary key component product. While evacuation of bed A1 continues, depressurization of bed B1 (step (4)) is completed by closing valve 56, and the bed is purged (step (5)) at between 15 and 30 psia by opening valve 51 and passing high-purity key component product from manifold 204 through pressure reduction valve 206, manifold 213, valve 51, and through line 222, bed B1, valve 46, and manifold 208. Alternatively, some or all of the purge gas for bed B1 can be supplied from the additional primary key component recovered in the third bed of adsorbent as discussed below by passing this additional primary key component through line 310, control valve 207, line 311, and into manifold 213. Purge effluent can be used as fuel or for other purposes. While purging of bed B1 continues, evacuation of bed A1 (step (3)) is completed by closing valve 31. Purging of bed B1 is completed by closing valves 46 and 51.

Bed A1 is then pressurized (step (3a)) by opening valve 16 whereby a portion of purge effluent from bed A3 (which is on its purge step (2)) is taken from manifold 103 into bed A1 thus pressurizing it to the fourth intermediate pressure. At the same time, bed B1 is pressurized (step (5a)) by opening valves 41 and 43 to connect it with bed B3 which has just completed its depressurization step (1b)). Other valves associated with bed B3 are closed. Gas flows from bed B3 through valve 43, manifold 210, and valve 41 into bed B1 until the pressures in both beds are equalized at the third intermediate pressure. At this point pressurization of bed A (step (3a)) is completed by closing valve 16 and pressurization of bed B1 (step (5a)) is completed by closing valve 43. Bed A1 is then further pressurized (step (3b)) by opening valves 26 and 29 by connecting it with bed A4 which has completed its adsorption step. Gas flows from bed A4 through valve 29, manifold 115, and valve 26 into bed A1 until the pressures in both beds are equalized at the first intermediate pressure. As this step begins, bed B1 is also further pressurized (step (5b)) by opening valve 44 which connects bed B1 with bed B4 which has completed its adsorption step. Gas flows from bed B4 through valve 44, manifold 210, and valve 41 into bed B1 until the pressures in both beds are equalized at the second intermediate pressure. During this pressurization step, pressurization of bed A1 (step (3b)) is completed by closing valves 26 and 29. Then, after a time period, further pressurization of bed B1 (step (5b)) is completed by closing valves 41 and 44. Finally, beds A1 and B1 are pressurized; valve 36 is opened and high purity primary product flows through manifold 204, flow control valve 205, manifold 214, valve 36, line 222, and into bed B1. Valve 6 also is opened, and gas flows from bed B1 into bed A1. At the completion of this step valve 36 is closed, beds A1 and B1 are at the pressure of adsorption step, and another cycle is ready to begin.

Figure 6:
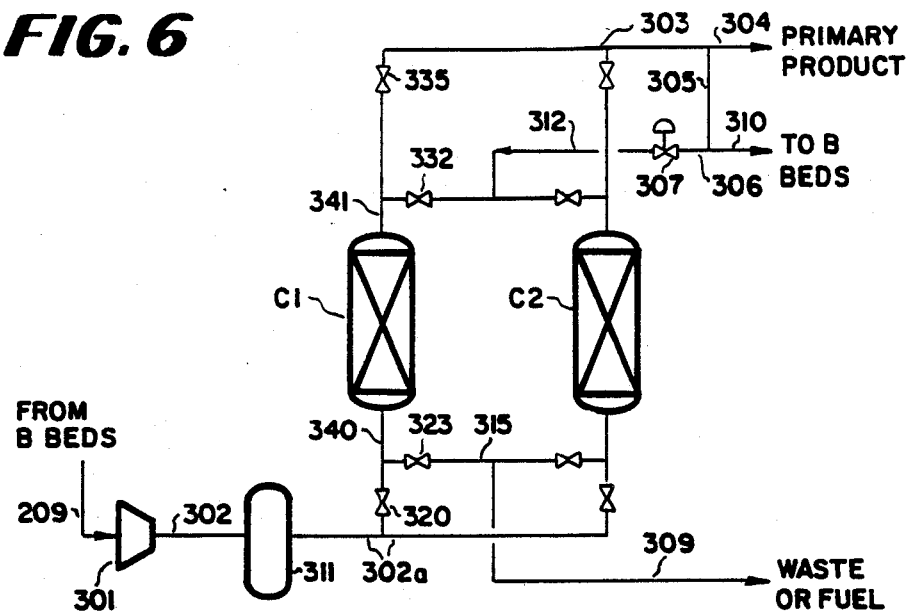
FIG. 6 is a process flow diagram of the third (C) beds for additional primary product recovery in an alternate embodiment of the present invention.

Additional primary key component optionally can be recovered from the depressurization gas withdrawn from the second bed during step (4) and from the second bed purge effluent stream of step (5). Gas from these steps is collected for further recovery through line 209, compressor 301, and line 302 as shown in FIGS. 3, 4, and 5. In the first option for this additional recovery of primary key component, two additional beds of adsorbent are utilized as shown in the process flow diagram of FIG. 6. Adsorbent beds C1 and C2 undergo in turn the cycle steps given in Table 7; only the details of the steps for bed C1 will be given. Referring to FIG. 6 and Table 7, depressurization gas and purge effluent from the second or B beds flow through line 209, the stream is compressed in compressor 301 and flows through line 302, into gas storage vessel 311, through manifold 302a, and valve 320, line 340, bed C1, line 341, valve 335, and manifold 303. Valves 323 and 332 remain closed during this step. A portion of the gas in manifold 303 may be taken as additional primary key component product in line 304. A portion of gas is taken through line 305 and line 310 for purging of the second (B) beds, and the remainder flows through line 306 for repressurization of bed C2. When the concentration of impurity components in the bed C1 effluent reaches a predetermined level, valves 320 and 335 are closed. Feed flow is then switched to bed C2, and valve 323 is opened to depressurize bed C1. Depressurization gas flows through line 340, valve 323, manifold 315, and line 309 to waste or for use as fuel. Next, valve 332 is opened to admit primary product through line 306, control valve 307, manifold 312, valve 332, and line 341 to purge bed C1. Purge effluent passes through valve 323, manifold 315, and line 309. When the purge step is complete, valve 323 is closed and gas flow through valve 332 continues until bed C1 is pressurized to the adsorption pressure. The entire cycle is then repeated.

In the second option for additional recovery of primary key component, three beds of adsorbent are utilized as shown in the process flow diagram of

TABLE 7

PROCESS CYCLE STEPS

| TWO-BED OPTION | | THREE-BED OPTION | | | |
|---|---|---|---|---|---|
| PURGE RECOVERY BEDS | | | | | |
| TIME | BED | | TIME | BED | |
| PERIOD | $C_1$ | $C_2$ | PERIOD | $C_1$ | $C_2$ | $C_3$ |
| 1 | A | DP | 1 | A | PE | PE |
| 2 | A | PU | 2 | A | PE | PE |
| 3 | A | RP | 3 | A | PE | PE |
| 4 | DP | A | 4 | A | PR | D |
| 5 | PU | A | 5 | A | PR | PU |
| 6 | RP | A | 6 | A | PR | PU |
| | | | 7 | PE | A | PE |
| | | | 8 | PE | A | PE |
| | | | 9 | PE | A | PE |
| | | | 10 | DP | A | PR |
| | | | 11 | PU | A | PR |
| | | | 12 | PU | A | PR |
| | | | 13 | PE | PE | A |
| | | | 14 | PE | PE | A |
| | | | 15 | PE | PE | A |
| | | | 16 | PR | DP | A |
| | | | 17 | PR | PU | A |
| | | | 18 | PR | PU | A |

A = Adsorption (Step a)
DP = Depressurization (Step b)
PU = Purge (Step c)
RP = Repressurization (Step d)
PE = Pressure Equalization (Steps a1 and c1)

Figure 7:
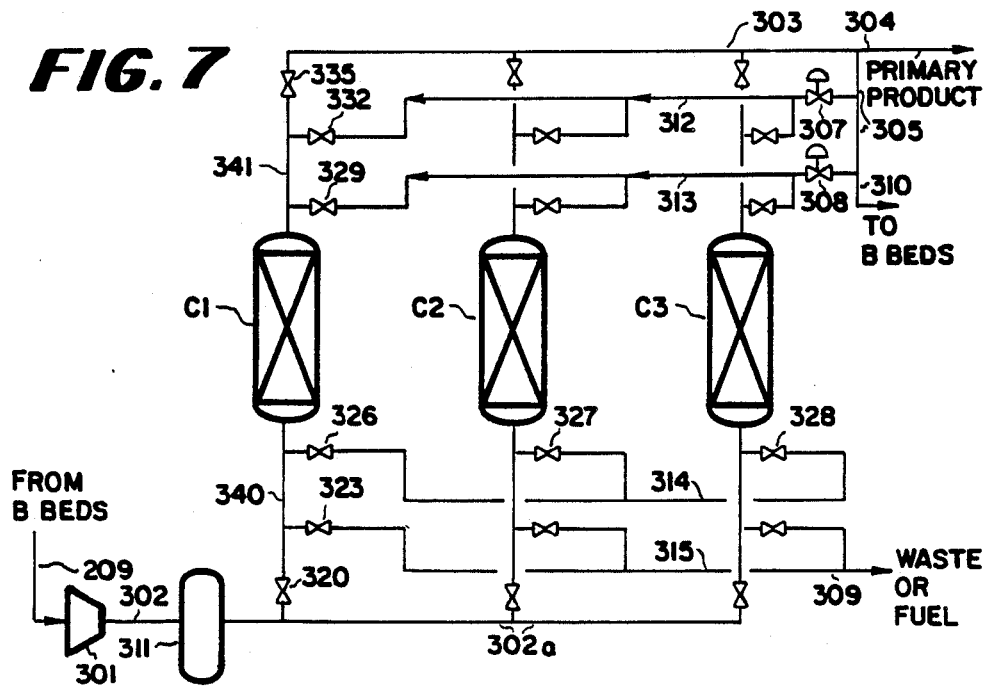
FIG. 7 is a process flow diagram of the third (C) beds for additional primary product recovery in another alternate embodiment of the present invention.

FIG. 7. Adsorbent beds C1, C2, nd C3 undergo in turn the cycle steps given in Table 7; only the details of the step for bed C1 will be given. Referring to FIG. 7 and Table 7, depressurization gas and purge effluent from the second or B beds flow through line 209, are compressed in compressor 301, flow through line 302 and pass into gas storage vessel 311. Gas flows from vessel 311 through manifold 302a, valve 320, line 340, and through bed C1. At this point, valves 323, 326, 329 and 332 are all closed from previous steps. Primary key component flows through line 341, valve 335 and manifold 303; a portion may be taken as product through line 304. The remainder flows through manifold 305, from which a portion flows through line 310 for purging of the second or B beds. The remainder flows through valves 307 and 308 for purge and pressurization of other C beds. When the concentration of impurity components in the effluent from bed C1 reaches a predetermined level, valves 320 and 335 are closed. Feed flow is then switched to bed C2. Bed C1 is then depressurized by opening valves 326 and 328 to connect it with bed C3 which has just completed a purge step and is isolated at a lower pressure. Gas flows from bed C1 through valve 326, manifold 314, valve 328, and into bed C3 until the pressures in both beds are equalized at an intermediate pressure. Valves 326 and 328 are then closed. Bed C1 is then depressurized to near atmospheric pressure by opening valve 323 whereby gas flows from bed C1 through line 340, manifold 315, and line 309 to waste or for fuel. Valve 332 is then opened and bed C1 is purged with primary key component which flows through manifold 305, control valve 307, manifold 312, valve 332, line 341, and bed C1. Purge effluent passes through line 340, valve 323, manifold 315, and line 309 to waste or for fuel. Valves 323 and 332 are closed and bed C1 is pressurized by opening valves 326 and 327 to connect it with bed C2 which has just completed its adsorption step. Gas flows from bed C2 through valves 327, manifold 314, and valve 326 into bed C1 until the pressures are equalized at an intermediate pressure. Valves 326 and 327 are then closed and bed C1 is pressurized by opening valve 329, whereby primary key component flows through manifold 305, control valve 308, manifold 313, valve 329, and into bed C1 until the pressure reaches the adsorption pressure. Valve 319 is then closed and bed C1 undergoes another cycle.

The cycle steps described above and summarized in Tables 1, 3, 4, 5, and 7 can be carried out over appropriate time periods which will depend upon feed gas composition, pressure, product purity requirements, and other factors. In typical cases, the cycle steps summarized in Tables 1 and 2 would repeat every 16 minutes and the cycle steps in Tables 3 and 4 would repeat every 20 minutes. The duration of the additional product recovery cycles given in Table 5 would typically be 10 minutes for the two-bed option and 15 minutes for the three-bed option.

The duration of the adsorption step depends upon several factors including required primary product purity, feed composition, adsorbent bed pressure and temperature, and bed size. Typically the duration is chosen to yield an impurity level in the primary product which is conservatively less than that of the primary product purity specification. Based on the above mentioned factors, and other design considerations, a typical adsorption step would be four to five minutes in duration, and the concentration of impurities in the very high purity hydrogen primary product at the end of the step typically would be less than 0.001 mole %.

In the four embodiments discussed above, final pressurization of the first (A) and second (B) beds (step (6)) is typically completed when the beds reach the pressure of the adsorption step. Optionally, the final pressurization step can be terminated at an intermediate pressure somewhat below the adsorption pressure, in which case the first (A) and second (B) beds would be pressurized from this intermediate pressure to the adsorption pressure by the multicomponent feed gas at the initiation of the adsorption step.

The adsorbent used in the first (A) beds should be capable of selectively adsorbing the secondary key component from the feed gas mixture at high selectivity and working capacity, and possessing relatively fast adsorption kinetics and low heat of adsorption for this component. The adsorption used in the second (B) beds and the third (C) beds should be selective for the secondary key components as well as the tertiary components, and may include more than one type of adsorbent in multiple layers in each bed. A number of commercially available adsorbents fit these requirements for components in most typical gas mixtures amenable to adsorption separation. For the recovery of hydrogen and carbon dioxide from a mixture also containing methane, carbon monoxide, and nitrogen, a NaX zeolite is preferred in the first (A) beds and a combination of NaX and CaA zeolites is preferred in the second (B) beds. Other adsorbents may be used depending on the process pressure and temperature, product purity and recovery requirements, feed gas composition, adsorbent cost relative to product value, and other factors involved in specific applications.

The cycles as described above and summarized in Tables 1 through 5 are carried out as previously discussed in the adsorption system illustrated in the process flow diagrams of FIGS. 3, 4, 5, 6, and 7. The control of the cycles by opening and closing the appropriate valves was described earlier for one of the first (A) beds in series with one of the second (B) beds, and for one of the third (C) beds. The appropriate control of the cycle steps in the additional beds of each system is achieved by similar operation of additional valves in the systems. For illustration, the complete valve timing chart for the first embodiment utilizing the flowsheet of FIG. 3 is given in Table 2. The complete valve timing chart for the fourth embodiment utilizing the flowsheet of FIG. 5 is given in Table 6.

The present invention is an improved process for the recovery of two individual components from a gas mixture at high purity and high recovery. The process can be used to recover hydrogen as the primary component and carbon dioxide as the secondary component from a feed mixture which also includes carbon monoxide, methane, and nitrogen as tertiary components. Alternately, the process can be used to recover hydrogen as the primary component and carbon monoxide as the secondary component from a feed mixture which includes tertiary impurities such as nitrogen which adsorb more strongly than hydrogen but less strongly than carbon monoxide. The process also can be used to recover hydrogen as the primary component and $C_2+$ hydrocarbons as the secondary component from a mixture which also includes tertiary components such as methane or nitrogen.

The process of the present invention has several important improvements over prior art processes such as, for example, the process of U.S. Pat. Re. 31,014 cited earlier. The low pressure purge step (2) of the present invention eliminates the prior art high pressure rinse step, and thus eliminates the need for a high pressure rinse compressor which reduces capital costs and power consumption. Another improvement of the present invention compared with the cited patent is that each first (A) bed is paired with a corresponding second (B) bed during the adsorption and final depressurization steps of the process cycle. This allows for a more efficient process piping and valving arrangement, and for two of the embodiments reduces the total number of beds required from nine to eight.

It has been discovered that if the selectivity of the most strongly adsorbed component (the secondary key component) is greater than about 20, the first (A) bed after depressurization is nearly saturated with the most strongly adsorbed component; the amount of low pressure purge gas required to completely saturate the bed and thus give a high-purity product by evacuation is less than the amount of rinse gas used in the prior art high pressure rinse step. Low pressure purging is also more efficient than a high pressure rinse since selectivity increases as pressure is decreased. Selectivity of the secondary key component (2) to the primary key component (1) on a given adsorbent is defined as:

$$S(2:1) = \left[ \frac{\text{Adsorbent Capacity (2)}}{\text{Gas Phase Mole Fraction (2)}} \right] \div$$

$$\left[ \frac{\text{Adsorbent Capacity (1)}}{\text{Gas Phase Mole Fraction (1)}} \right]$$

The utilization of additional pressure equalization steps over the cited prior art process also improves the performance of the process of the present invention. By employing additional pressure equalizations between the first (A) beds and second (B) beds, as for example step (3a) of Table 2, recovery of primary key component product is increased. By employing additional pressure equalizations between the first (A) beds, the power consumption and size of recycle compressor 104 (FIGS. 1, 2, 3, and 4) can be reduced. These additional pressure equalizations are step (3a) of Table 3 and steps (1a) and (3a) of Table 4.

A comparison between operating and equipment parameters for the process of the second embodiment of the present invention and the above-referenced prior art process is given in Table 8. The prior art process performance is based upon pilot plant testing and commercial-scale plant operation using the prior art adsorption cycle. The predicted process performance of the present invention is based upon the adsorption cycle of embodiment #2 with process design and mass balance calculations using laboratory pilot plant data and commercial-scale plant test data. As illustrated in Table 8, the predicted process performance of this embodiment of the present invention is essentially equivalent to the prior art process performance for purity and recovery of the two product components. However, the compressor size and power, and the vacuum blower power, are reduced for the present invention. In addition, the process equipment is simplified, requiring one less adsorbent vessel and 16 fewer valves than the prior art process.

TABLE 8

|  | Present Invention | Prior Art |
|---|---|---|
| $H_2$ purity, mole % | 99.999 | 99.999 |
| $H_2$ recovery, % | 87+ | 87 |
| $CO_2$ purity, mole % | 99.7 | 99.0+ |
| $CO_2$ recovery, % | 91 | 91 |
| Relative compressor size | 0.5 | 1.0 |
| Relative compressor power | 0.7 | 1.0 |
| Relative vacuum blower power | 0.9 | 1.0 |
| Number of adsorbent beds | 8 | 9 |
| Number of valves | 52 | 68 |

I claim:

1. In the separation of a multicomponent gas mixture by pressure swing adsorption to recover as individual products a primary key component and a secondary key component, wherein the secondary key component is more strongly adsorbed than the primary key component and there is present in the multicomponent gas mixture one or more minor tertiary components at low concentrations which are less strongly adsorbed than the secondary key component, by passing the multicomponent gas mixture in an adsorption step through a first bed of adsorbent selective for retention of the secondary key component, passing the effluent from said first bed through a second bed of adsorbent selective for the retention of the secondary key component and of the one or more minor tertiary components, withdrawing from said second bed a high purity product stream of the primary key component, and continuing said passing of the multicomponent gas mixture through the first and second beds for a predetermined time period or until the concentration of the secondary key component in the effluent from the first bed or the concentration of at least one of the tertiary components in said high-purity stream of said primary key component from the second bed reaches a predetermined level; the improvement comprising discontinuation of flow of the multicomponent gas mixture through said first and second beds at the end of said adsorption step and thereafter during a mutually extending time period:

(1) immediately following said discontinuation of flow through said first and second beds, depressurizing said first bed by withdrawing therefrom a gas stream comprising desorbed and void space gas;

(2) purging said first bed by passing therethrough a stream of the secondary key component whereby substantially all remaining primary key component and substantially all remaining tertiary components are displaced from said first bed and are withdrawn in a first purge effluent stream;

(3) evacuating said first bed by withdrawing therefrom a product stream comprising the secondary key component;

(4) depressurizing said second bed by withdrawing therefrom a gas stream comprising desorbed and void space gas; and (5) purging said second bed by passing therethrough a stream of the primary key component whereby additional adsorbed components are desorbed and are withdrawn along with remaining void space gas in a second purge effluent stream; and thereafter following said mutually extending time period:

(6) pressurizing said first and second beds to a pressure up to the pressure of the adsorption step by passing a portion of said high purity product stream of primary key component into and through said second bed and passing pressurization effluent from said second bed into said first bed, whereby both beds are prepared for another cycle beginning with said adsorption step.

2. The process as recited in claim 1 wherein said first bed of adsorbent is one of a first group of multiple parallel beds and said second bed of adsorbent is one of a second group of multiple parallel beds, wherein each bed of said first group is paired with a corresponding bed of said second group, and wherein each pair of beds undergoes in turn said adsorption step, steps (1) through (5) during said mutually extending time period, and step (6).

3. The process as recited in claim 2 wherein said first group comprises at least four parallel beds and said second group comprises at least four parallel beds.

4. The process as recited in claim 1 wherein said gas stream withdrawn during step (1) is recycled and combined with the multicomponent gas mixture, and the combined stream is passed as feed to said first bed of adsorbent.

5. The process as recited in claim 1 wherein said first purge effluent stream from purge step (2) of said first bed is recycled and combined with the multicomponent gas mixture, and the combined stream is passed as feed to said first bed of adsorbent.

6. The process as recited in claim 1 wherein said primary key component is hydrogen, said secondary key component is carbon dioxide, and said minor tertiary components comprise one or more components selected from the group consisting of carbon monoxide, methane, and nitrogen.

7. The process as recited in claim 1 wherein additional primary key component is recovered by compressing said gas stream withdrawn from said second bed during step (4) and passing the compressed gas to a gas storage vessel, compressing said second purge effluent stream withdrawn from said second bed during step (5) and passing the compressed stream to said gas storage vessel, and carrying out the steps of:

(a) withdrawing gas from said gas storage vessel and passing the gas through a third bed of adsorbent selective for the retention of the secondary key component and the one or more tertiary components and withdrawing therefrom a high purity product stream of primary key component, continuing said passing until the concentration of secondary or tertiary components in the effluent from said third bed reaches a predetermined level, and terminating gas flow through said third bed;

(b) depressurizing said third bed by withdrawing gas therefrom;

(c) purging said third bed by passing therethrough a stream of said high-purity primary key component at near-ambient pressure whereby desorbed tertiary components and void space gas are withdrawn along with primary key component as a third purge effluent stream; and (d) repressurizing said third bed with a stream of said high-purity primary key component to the pressure of step (a) in preparation for another adsorption step;

and further wherein at least a portion of said high-purity primary key component withdrawn from said third bed during step (a) is used to purge said second bed of adsorbent.

8. The process as recited in claim 7 wherein said third bed of adsorbent is one of a group of two parallel beds each of which undergoes in turn the steps (a) through (d).

9. The process as recited in claim 7 wherein following step (3) and step (5) and preceding step (6) at least another portion of said high-purity primary key component withdrawn from said third bed during step (a) is used to pressurize said first and second beds to a pressure less than the pressure of the adsorption step by passing said other portion of high-purity primary key component into and through said second bed and passing the effluent from said second bed into said first bed.

10. The process as recited in claim 1 wherein additional primary key component is recovered by compressing said depressurization gas withdrawn from said second bed during step (4) and passing the compressed gas to a gas storage vessel, compressing said second purge effluent stream withdrawn from said second bed during step (5) and passing the compressed stream to said gas storage vessel, and carrying out the steps of:

(a) withdrawing gas from said gas storage vessel and passing the gas through a third bed of adsorbent selective for the retention of the secondary key component and the one or more tertiary components and withdrawing therefrom a high-purity product stream of primary key component, continuing said passing until the concentration of secondary or tertiary components in the effluent from said third bed reaches a predetermined level, and terminating gas flow through said third bed;

(a1) depressurizing said third bed by connecting it with another third bed which is initially at a lower pressure, whereby gas flows from said third bed into said another third bed so that the pressures in both beds are equalized at an intermediate pressure;

(b) further depressurizing said third bed by withdrawing additional gas therefrom;

(c) purging said third bed by passing therethrough a stream of said high-purity primary key component whereby additional adsorbed components are desorbed and along with remaining void space gas are withdrawn as a waste stream;

(C1) pressurizing said third bed to the intermediate pressure by connecting it with yet another third bed which is initially at the pressure of adsorption step (a) whereby gas flows from said yet another third bed into said third bed so that the pressures in both beds are equalized; and (d) further pressurizing said third bed to the pressure of adsorption step (a) by introducing thereinto a stream of said high-purity primary key component;

and further wherein at least a portion of said high-purity primary key component withdrawn from said third bed during step (a) is used to purge said second bed of adsorbent.

11. The process as recited in claim 10 wherein said third bed of adsorbent is one of a group of three parallel beds each of which undergoes in turn the steps (a) through (d).

12. The process as recited in claim 10 wherein following step (3) and step (5) and preceding step (6) at least another portion of said high-purity primary key component withdrawn from said third bed during step (a) is used to pressurize said first and second beds to a pressure less than the pressure of the adsorption step by passing said other portion of said high-purity primary key component into and through said second bed and passing the effluent from said second bed into said first bed.

13. The process as recited in claim 1 further comprising during said mutually extending time period the steps of:

(1a) following completion of the adsorption step, depressurizing said second bed to a first intermediate pressure by connecting it with another first bed which has completed step (3) whereby gas flows from said second bed into said other first bed so that the pressures in both beds are equalized;

(1b) following step (1a), further depressurizing said second bed to a second intermediate pressure by connecting it with another second bed which has completed step (5) whereby additional gas flows from said second bed into said other second bed so that the pressures in both beds are equalized;

(3a) following step (3), pressurizing said first bed to said first intermediate pressure by connecting it with said other second bed which has completed its adsorption step whereby gas flows from said other second bed into said first bed so that the pressures in both beds are equalized; and (5a) following step (5), pressurizing said second bed to said second intermediate pressure by connecting it with said other second bed which has completed step (1a) whereby gas flows from said other second bed into said second bed so that the pressures in both beds are equalized.

14. The process as recited in claim 13 wherein said first bed of adsorbent is one of a first group of four parallel beds and said second bed of adsorbent is one of a second group of four parallel beds, wherein each bed of said first group is paired with a corresponding bed of said second group, and wherein each pair of beds undergoes the adsorption step, steps (1) through (5a) during said mutually extending time period, and step (6).

15. The process as recited in claim 13 wherein said gas stream withdrawn during step (1) is recycled and combined with the multicomponent gas mixture, and the combined stream is passed as feed to said first bed of adsorbent.

16. The process as recited in claim 13 wherein said first purge effluent stream from step (2) is recycled and combined with the multicomponent gas mixture, and the combined stream is passed as feed to said first bed of adsorbent.

17. The process as recited in claim 13 wherein additional primary key component is recovered by compressing said gas stream withdrawn from said second bed during step (4) and passing the compressed gas to a gas storage vessel, compressing said second purge effluent stream withdrawn from said second bed during step (5) and passing the compressed stream to said gas storage vessel, and carrying out the steps of:

(a) withdrawing gas from said gas storage vessel and passing the gas through a third bed of adsorbent selective for the retention of the one or more tertiary components and withdrawing therefrom a high purity product stream of primary key component, continuing said passing until the concentration of secondary or tertiary components in the effluent from said third bed reaches a predetermined level, and terminating gas flow through said third bed;

(b) depressurizing said third bed by withdrawing gas therefrom;

(c) purging said third bed by passing therethrough a stream of said high-purity primary key component at near-ambient pressure whereby desorbed tertiary components and void space gas are withdrawn along with primary key component as a third purge effluent stream; and (d) repressurizing said third bed with a stream of said high-purity primary key component to the pressure of step (a) in preparation for another adsorption step;

and further wherein at least a portion of said high-purity primary key component withdrawn from said third bed during step (c) is used to purge said second bed of adsorbent.

18. The process as recited in claim 17 wherein said third bed of adsorbent is one of a group of two parallel beds each of which undergoes in turn the steps (a) through (d).

19. The process as recited in claim 13 wherein additional primary key component is recovered by compressing said second purge effluent stream withdrawn from said second bed during step (5) and passing the compressed stream to a gas storage vessel, compressing said gas stream withdrawn from said second bed during step (4) and passing the compressed gas to said gas storage vessel, and carrying out the steps of:

(a) withdrawing gas from said gas storage vessel and passing the gas through a third bed of adsorbent selective for the retention of the one or more tertiary components and withdrawing therefrom a high-purity product stream of primary key component, continuing said passing until the concentration of secondary or tertiary components in the effluent from said third bed reaches a predetermined level, and terminating gas flow through said third base;

(a1) depressurizing said third bed by connecting it with another third bed which is initially at a lower pressure, whereby gas flows from said third bed into said other third bed so that the pressures in both beds are equalized at an intermediate pressure;

(b) further depressurizing said third bed by withdrawing additional gas therefrom;

(c) purging said third bed by passing therethrough a stream of said high-purity primary key component whereby additional adsorbed components are desorbed and along with remaining void space gas are withdrawn as a waste stream;

(c1) pressurizing said third bed to the intermediate pressure by connecting it with yet another third bed which is initially at the pressure of adsorption step (a) whereby gas flows from said yet another third bed into said third bed so that the pressures in both beds are equalized; and (d) further pressurizing said third bed to the pressure of adsorption step (a) by introducing thereinto a stream of said high-purity primary key component;

and further wherein at least a portion of said high-purity primary key component withdrawn from said third bed during step (a) is used to purge said second bed of adsorbent.

20. The process as recited in claim 19 wherein said third bed of adsorbent is one of a group of three parallel beds each of which undergoes in turn the sequential steps (a) through (d).

21. The process as recited in claim 13 wherein said primary key component is hydrogen, said secondary key component is carbon dioxide, and said minor tertiary components comprise one or more components selected from the group consisting of carbon monoxide, methane, and nitrogen.

22. The process as recited in claim 1 further comprising during said mutually extending time period the steps of:

(1a) following completion of the adsorption step, depressurizing said second bed to a first intermediate pressure by connecting it with another second bed which has completed step (5) whereby gas flows from said second bed into said other second bed so that the pressures in both beds are equalized;

(1b) following step (1a), further depressurizing said second bed to a second intermediate pressure by connecting it with another first bed which is initially at a third intermediate pressure whereby additional gas flows from said second bed into said other first bed so that the pressures in both beds are equalized;

(1c) following step (1b), still further depressurizing said second bed to said third intermediate pressure by connecting it with yet another first bed which has completed step (3) whereby gas flows from said second bed into said yet another first bed so that the pressures in both beds are equalized;

(3a) following step (3), pressurizing said first bed to said third intermediate pressure by connecting it with yet another second bed which has completed step (1b) whereby gas flows from said yet another second bed into said first bed so that the pressures in both beds are equalized;

(5a) after completion of step (5), pressurizing said second bed to said first intermediate pressure by connecting it with said other second bed which has completed its adsorption step whereby gas flows from said other second bed into said second bed so that the pressures in both beds are equalized; and (3b) upon completion of step (3a), further pressurizing said first bed to said second intermediate pressure by connecting it with said other second bed which has completed step (1a), whereby gas flows from said other second bed into said first bed so that the pressures in both beds are equalized.

23. The process as recited in claim 22 wherein said first bed of adsorbent is one of a first group of four parallel beds and said second bed of adsorbent is one of a second group of four parallel beds, wherein each bed of said first group is paired with a corresponding bed of said second group, and wherein each pair of beds undergoes in turn said adsorption step, steps (1) through (5a) during said mutually extending time period, and step (6).

24. The process as recited in claim 1 further comprising during said mutually extending time period the steps of:

(1a) following the adsorption step and during step (1), depressurizing said second bed to a first intermediate pressure by connecting it with another second bed initially at a second intermediate pressure whereby gas flows from said second bed into said other second bed so that the pressures in both beds are equalized;

(1b) following step (1a) and beginning during step (1), further depressurizing said second bed to a second intermediate pressure by connecting it with yet another second bed which has completed step (5) whereby gas flows from said second bed into said yet another second bed so that the pressures in both beds are equalized, and completing said further depressurizing during step (2);

(1c) following step (1b) and during step (2), further depressurizing said second bed to a third intermediate pressure by connecting it with said other first bed which is initially at a fourth intermediate pressure whereby gas flows from said second bed into said other first bed so that the pressures in both beds are equalized;

(5a) following step (5), pressurizing said second bed to said second intermediate pressure by connecting it with said other second bed which has completed step (1a) whereby gas flows from said other second bed into said second bed so that the pressures in both beds are equalized;

(3a) following step (3), pressurizing said first bed to said fourth intermediate pressure by passing thereinto at least a portion of said first purge effluent stream from said other first bed;

(3b) following step (3a), further pressurizing said first bed to said third intermediate pressure by connecting it with said other second bed which has completed step (1b) whereby gas flows from said other second bed into said first bed so that the pressures in both beds are equalized; and (5b) following step (5a), further pressurizing said second bed to said first intermediate pressure by connecting it with yet another second bed which has completed its adsorption step, whereby gas flows from said yet another second bed into said second bed so that the pressures in both beds are equalized.

25. The process as recited in claim 24 wherein said first bed of adsorbent is one of a first group of five parallel beds and said second bed of adsorbent is one of a second group of five parallel beds, wherein each bed of said first group is paired with a corresponding bed of said second group, and wherein each pair of beds undergoes in turn said adsorption step, steps (1) through (5b) during said mutually extending time period, and step (6).

26. The process as recited in claim 1 further comprising during the said mutually extending time period the steps of:
   (1a) following the adsorption step, depressurizing said first bed to a first intermediate pressure by connecting it with another first bed initially at a fourth intermediate pressure whereby gas flows from said first bed into said other first bed so that the pressures in both beds are equalized;
   (1b) following the adsorption step, depressurizing said second bed to a second intermediate pressure by connecting it with another second bed initially at a third intermediate pressure whereby gas flows from said second bed to said other second bed so that the pressures in both beds are equalized;
   (1c) following step (1b), further depressurizing said second bed to a third intermediate pressure by connecting it with yet another second bed which has completed step (5), whereby gas flows from said second bed into said yet another second bed so that the pressures in both beds are equalized;
   (3a) following step (3), pressurizing said first bed to a fourth intermediate pressure by passing thereinto at least a portion of said first purge effluent stream from said other first bed;
   (5a) following step (5), pressurizing said second bed to said third intermediate pressure by connecting it with said other second bed which has completed step (1b) whereby gas flows from said other second bed into said second bed so that the pressures in both beds are equalized;
   (3b) following step (3a), further pressurizing said first bed to said first intermediate pressure by connecting it with yet another first bed which has completed its adsorption step whereby gas flows from said yet another first bed into said first bed so that the pressures in both beds are equalized; and
   (5b) following step (5a), further pressurizing said second bed to said second intermediate pressure by connecting it with said yet another second bed which has completed its adsorption step whereby gas flows from said yet another second bed into said second bed so that the pressures in both beds are equalized.

27. The process as recited in claim 26 wherein said first bed of adsorbent is one of a first group of five parallel beds and said second bed of adsorbent is one of a second group of five parallel beds, wherein each bed of said first group is paired with a corresponding bed of said second group, and wherein each pair of beds undergoes in turn said adsorption step, steps (1) through (5b) during said mutually extending time period, and step (6).

* * * * *